(12) United States Patent
Tsuruoka et al.

(10) Patent No.: US 7,738,699 B2
(45) Date of Patent: Jun. 15, 2010

(54) IMAGE PROCESSING APPARATUS

(75) Inventors: Takao Tsuruoka, Machida (JP); Kazuhito Horiuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/745,988

(22) Filed: May 8, 2007

(65) Prior Publication Data

US 2007/0206246 A1 Sep. 6, 2007

Related U.S. Application Data

(62) Division of application No. 10/807,479, filed on Mar. 23, 2004, now Pat. No. 7,574,042, which is a division of application No. 09/785,931, filed on Feb. 16, 2001, now Pat. No. 6,738,510.

(30) Foreign Application Priority Data

Feb. 22, 2000 (JP) .............................. 2000-044903
Feb. 22, 2000 (JP) .............................. 2000-044904

(51) Int. Cl.
*G06K 9/00* (2006.01)
*H04N 5/202* (2006.01)
*H04N 5/228* (2006.01)

(52) U.S. Cl. ...................... 382/169; 348/254; 348/222.1

(58) Field of Classification Search ................. 348/234, 348/254, 362; 382/169, 174
See application file for complete search history.

(56) References Cited

U.S. PATENT DOCUMENTS 4,792,979 A 12/1988 Nomura et al.
4,969,045 A * 11/1990 Haruki et al. ............ 348/229.1
5,140,649 A 8/1992 Kageyama (Continued)

FOREIGN PATENT DOCUMENTS

DE 197 13 199 A1 11/1997

(Continued)

OTHER PUBLICATIONS

Japanese Office Action dated Aug. 12, 2008, issued in counterpart Japanese Application No. 2000-044903.

(Continued)

*Primary Examiner*—Sinh Tran
*Assistant Examiner*—Albert H Cutler
(74) *Attorney, Agent, or Firm*—Frishauf, Holtz, Goodman & Chick, P.C.

(57) ABSTRACT

An image processing apparatus includes a photographing condition estimation unit for estimating a photographing condition of the input image based on photometric information and focal information. A Y/C separation unit separates the input image into a luminance signal and a color difference signal; a luminance correction unit extracts an edge from the luminance signal and corrects the luminance signal by a gradation conversion curve; a color difference correction unit corrects the color difference signal based on luminance signals obtained before and after the gradation correction and a theoretical limit characteristic of color reproduction; a skin color correction unit performs skin color correction depending on the photographing condition; and a Y/C synthesis unit synthesizes the luminance signal and the color difference signal obtained after the correction. Gradation correction is performed on the input image such that appropriate hue and saturation are achieved while emphasizing a main object.

23 Claims, 16 Drawing Sheets

U.S. PATENT DOCUMENTS

| | | | |
|---|---|---|---|
| 5,247,366 A * | 9/1993 | Ginosar et al. | 348/256 |
| 5,296,920 A | 3/1994 | Sakaue et al. | |
| 5,479,272 A | 12/1995 | Saito | |
| 5,579,417 A * | 11/1996 | Sakano | 382/298 |
| 5,715,377 A * | 2/1998 | Fukushima et al. | 358/1.9 |
| 5,719,661 A | 2/1998 | Terashita | |
| 5,739,924 A | 4/1998 | Sano | |
| 5,801,773 A * | 9/1998 | Ikeda | 348/229.1 |
| 5,828,793 A * | 10/1998 | Mann | 382/284 |
| 5,831,672 A | 11/1998 | Takei | |
| 5,835,616 A * | 11/1998 | Lobo et al. | 382/118 |
| 5,848,181 A | 12/1998 | Ogata | |
| 5,974,190 A * | 10/1999 | Maeda et al. | 382/255 |
| 5,978,106 A | 11/1999 | Hayashi | |
| 6,075,562 A | 6/2000 | Sakaguchi et al. | |
| 6,078,357 A * | 6/2000 | Yamamoto et al. | 348/234 |
| 6,111,980 A * | 8/2000 | Sano et al. | 382/167 |
| 6,219,097 B1 | 4/2001 | Kamishima et al. | |
| 6,266,102 B1 | 7/2001 | Azuma et al. | |
| 6,377,331 B1 | 4/2002 | Matsushima | |
| 6,825,884 B1 | 11/2004 | Horiuchi | |
| 2001/0001245 A1 * | 5/2001 | Kamishima et al. | 348/229 |
| 2002/0025079 A1 * | 2/2002 | Kuwata et al. | 382/254 |
| 2004/0032524 A1 * | 2/2004 | Silverbrook | 348/345 |
| 2004/0207734 A1 | 10/2004 | Horiuchi | |

FOREIGN PATENT DOCUMENTS

| | | |
|---|---|---|
| EP | 0 533 100 A2 | 3/1993 |
| EP | 0 905 964 A2 | 3/1999 |
| JP | 02-170782 A | 7/1990 |
| JP | 03-177981 A | 8/1991 |
| JP | 06-303633 A | 10/1994 |
| JP | 07-131708 A | 5/1995 |
| JP | 08-190121 A | 7/1996 |
| JP | 09-233336 A | 9/1997 |
| JP | 10-155112 A | 6/1998 |
| JP | 10-221773 A | 8/1998 |
| JP | 09-298885 A | 3/1999 |
| JP | 11-252422 A | 9/1999 |
| JP | 11-297259 A | 10/1999 |
| JP | 2000-228747 | 8/2000 |

OTHER PUBLICATIONS

Japanese Office Action dated Aug. 12, 2008, issued in counterpart Japanese Application No. 2000-044904.

English translation of Japanese Office Action dated Aug. 12, 2008, issued in counterpart Japanese Application.

* cited by examiner

FIG.4

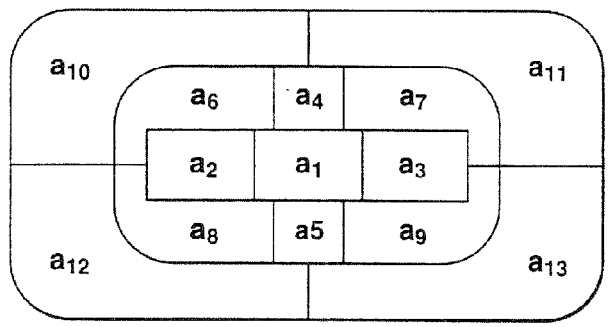

FIG.5

| AF INFORMATION | AE INFORMATION | DISTRIBUTION STATE OF SUBJECT | TYPE |
|---|---|---|---|
| 5m ~ ∞ | $S_3 > Th_1$ | LANDSCAPE CONTAINING SKY ON UPPER SIDE | Type 1 |
|  | $S_3 < Th_1$ | LANDSCAPE CONTAINING NO (SLIGHT) SKY ON UPPER SIDE | Type 2 |
| 1m ~ 5m | $S_2 > Th_2$ | PORTRAIT OF ONE PERSON | Type 3 |
|  | $S_2 < Th_2$ | PORTRAIT OF PLURAL PERSONS | Type 4 |
| 1m OR LESS | $S_1 > Th_3$ | CLOSEUP OF SINGLE SUBJECT | Type 5 |
|  | $S_1 < Th_3$ | CLOSEUP OF PLURAL SUBJECTS | Type 6 |

FIG.6A

| 0 | 0 | 0 | 0 |
|---|---|---|---|
| 1 | 1 | 1 | 1 |
| 1 | 1 | 1 | 1 |
| 1 | 1 | 1 | 1 |

Type 1

FIG.6B

| 1 | 1 | 1 | 1 |
|---|---|---|---|
| 1 | 1 | 1 | 1 |
| 1 | 1 | 1 | 1 |
| 1 | 1 | 1 | 1 |

Type 2

FIG.6C

| 0 | 1 | 1 | 0 |
|---|---|---|---|
| 1 | 8 | 8 | 1 |
| 1 | 1 | 1 | 1 |
| 0 | 1 | 1 | 0 |

Type 3

FIG.6D

| 0 | 1 | 1 | 0 |
|---|---|---|---|
| 4 | 4 | 4 | 4 |
| 2 | 4 | 4 | 2 |
| 1 | 1 | 1 | 1 |

Type 4

FIG.6E

| 1 | 1 | 1 | 1 |
|---|---|---|---|
| 1 | 4 | 4 | 1 |
| 1 | 4 | 4 | 1 |
| 1 | 1 | 1 | 1 |

Type 5

FIG.6F

| 1 | 1 | 1 | 1 |
|---|---|---|---|
| 1 | 2 | 2 | 1 |
| 1 | 2 | 2 | 1 |
| 1 | 1 | 1 | 1 |

Type 6

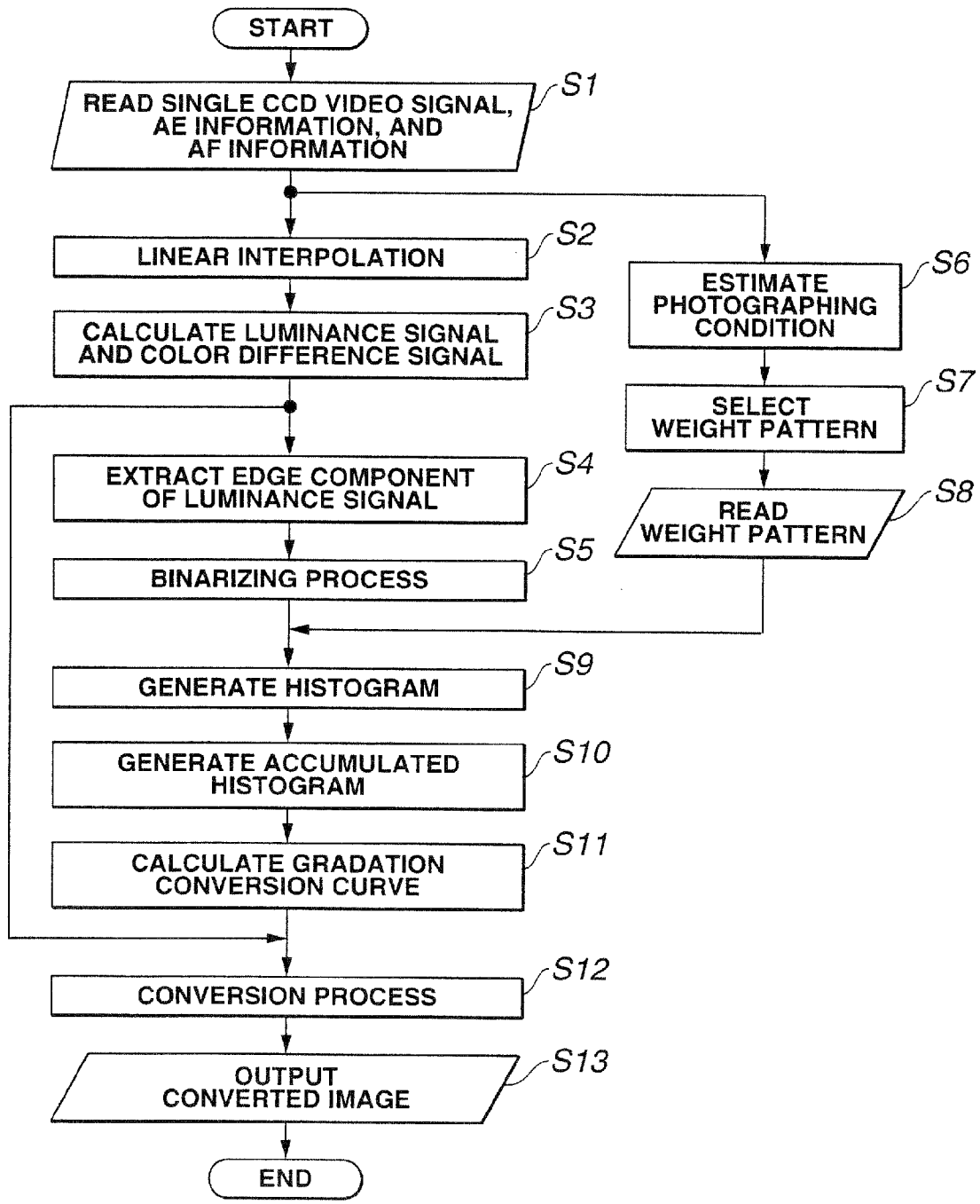

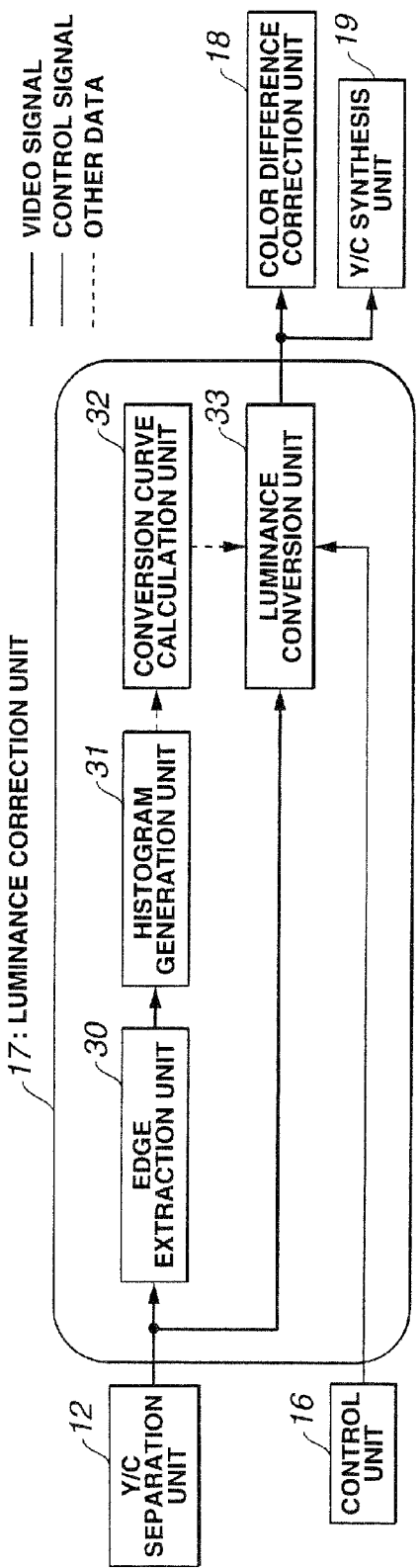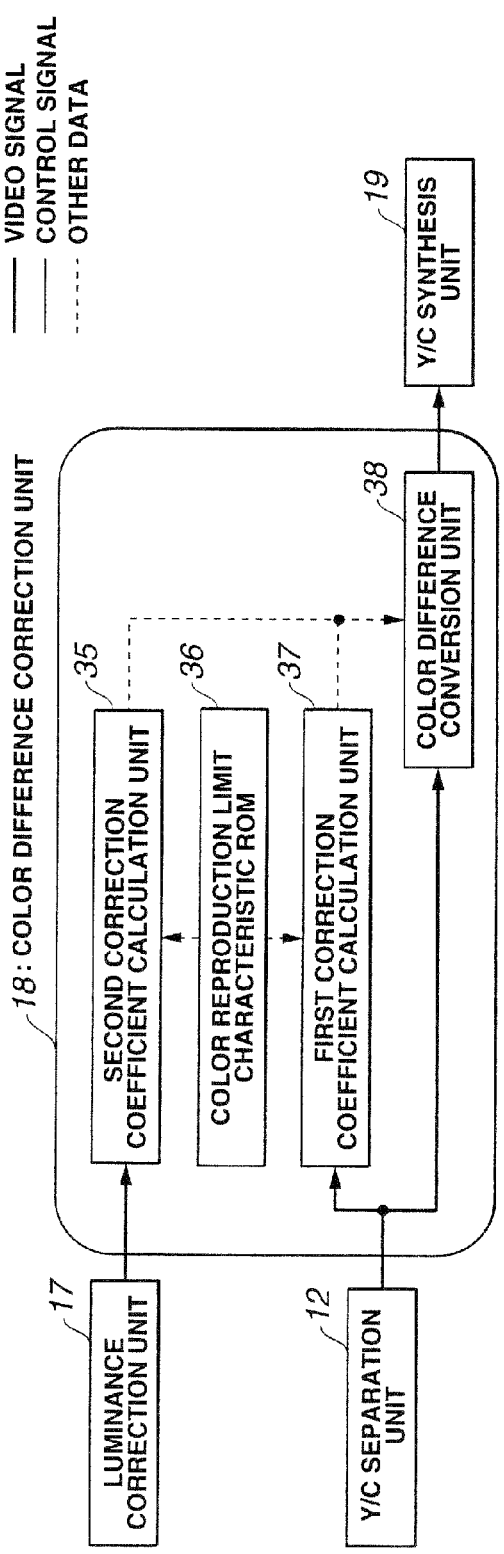

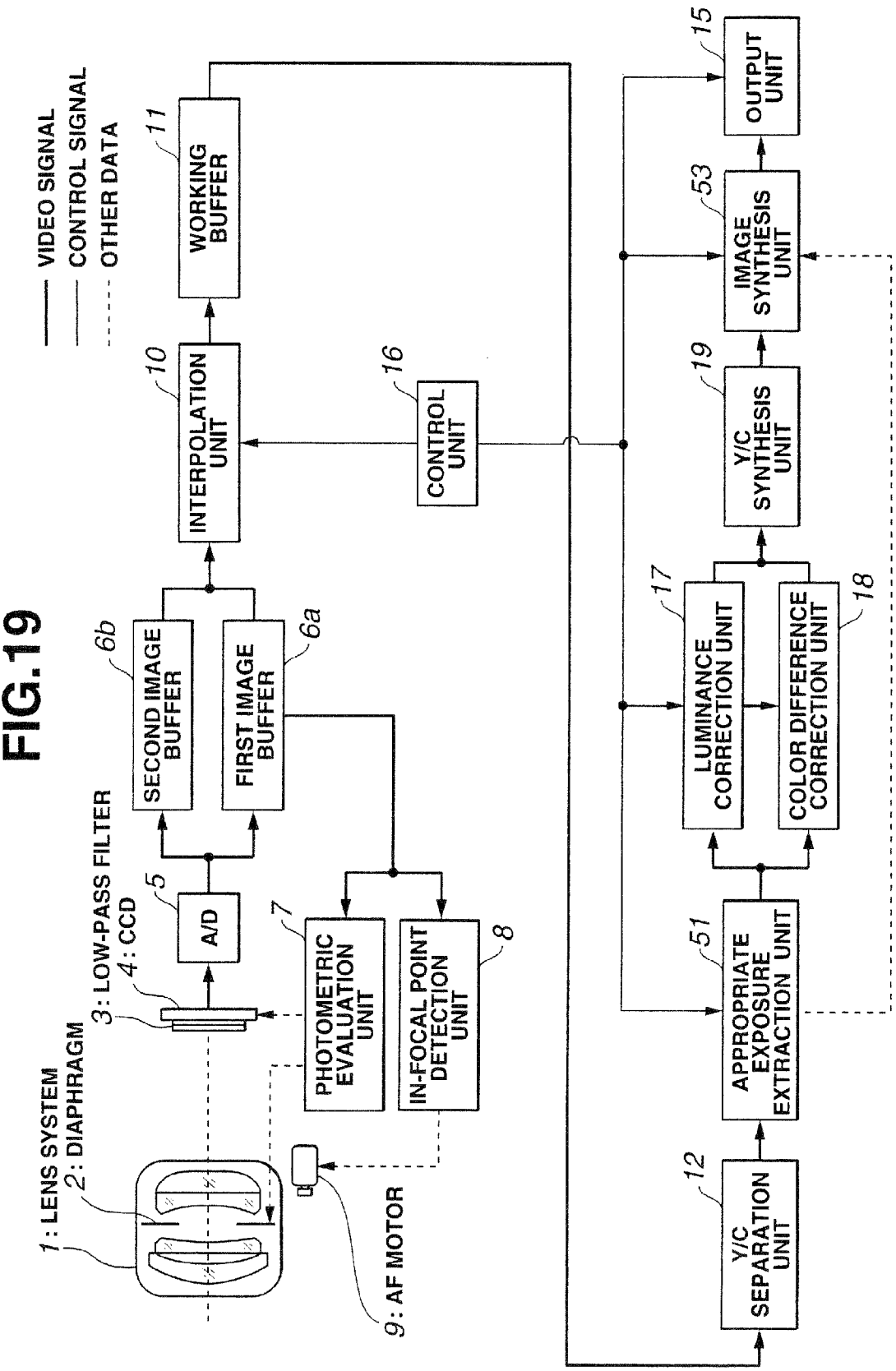

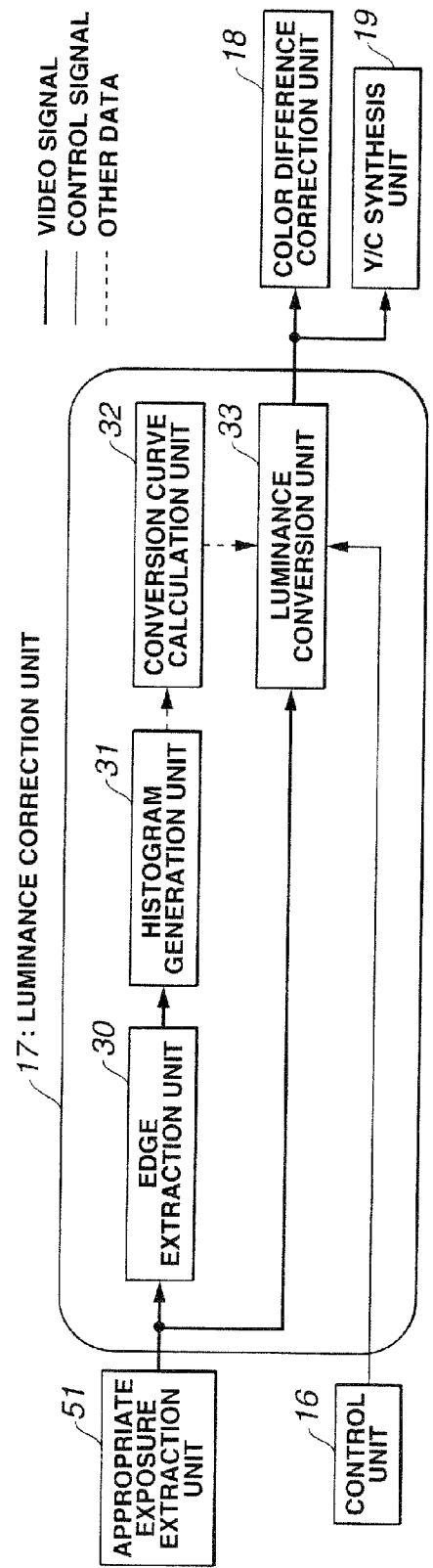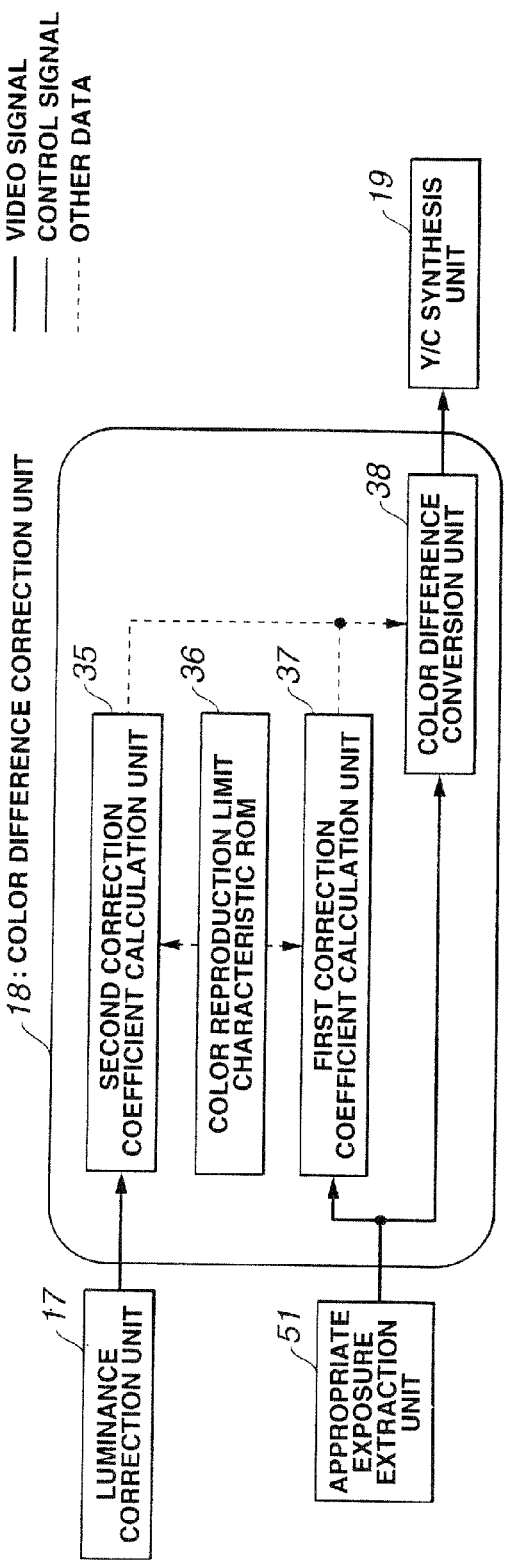

IMAGE PROCESSING APPARATUS

The present application is a Divisional Application of U.S. application Ser. No. 10/807,479, filed Mar. 23, 2004 now U.S. Pat. No. 7,574,042, which is a Divisional Application of Ser. No. 09/785,931, filed Feb. 16, 2001 (now U.S. Pat. No. 6,738,510) and claims the benefit of priority of Japanese Application No. 2000-044903 filed in Japan on Feb. 22, 2000 and Japanese Application No. 2000-044904 filed in Japan on Feb. 22, 2000, the contents of which are incorporated herein by reference.

BACKGROUND OF THE INVENTION

1. Field of the Invention

The present invention relates to an image processing apparatus and, more specifically, to an image processing apparatus for adjusting a gradation range of an input image.

2. Related Art Statement

In an image processing apparatus for synthesizing a plurality of images picked up under different exposure conditions to generate one wide dynamic range image, a technique for adjusting a gradation range is used. For example, in Japanese Patent Application No. 11-338551 which has not been published yet, an image processing device for dividing each of images into an appropriate exposure region and an inappropriate exposure region, performing gradation correction for each appropriate exposure region, and synthesizing the appropriate exposure regions of the images subjected to the gradation correction with each other to generate one wide dynamic range image is disclosed. In addition, as an example of an apparatus to which the image processing apparatus is applied, a super latitude digital camera being capable of picking up an image of an object in a wider dynamic range is described.

A gradation converting process in the image processing apparatus described above is performed on the basis of histogram flattening of an edge portion. This histogram flattening is a technique which is based on the assumption that a main object has a large number of edges, and the other portions such as a background have a small number of edges.

On the other hand, in a conventional digital camera, a color difference signal is also converted on the basis of a coefficient obtained when a luminance signal is subjected to gradation conversion. More specifically, it is assumed that a luminance signal $Y_{org}$ is converted by a gradation conversion characteristic F such that $Y_{tra}=F(Y_{org})$ is satisfied. In this case, conventionally, a conversion coefficient gain of a luminance signal is calculated by:

$$gain=Y_{tra}/Y_{org}, \text{ and}$$

the conversion coefficient is directly used to convert color difference signals as follows:

$$Cb_{tra}=gain \cdot Cb_{org}$$

$$Cr_{tra}=gain \cdot Cr_{org}.$$

In a digital camera, a bit count obtained when an image signal output as an analog signal from a CCD into a digital signal is often a bit count obtained when the image signal is processed and then recorded on, e.g., a recording medium.

In this case, even though a single input image is handled to perform conversion of an amount of information, especially, a reduction of an amount of information, the gradation range of the image may have to be adjusted.

The technique of gradation correction is popularly handled in various devices such as a printer device or a monitor device which is not limited to the digital camera and processes an image. The above technique can be applied to not only a case in which a plurality of images are handled but also a case in which a single input image is handled.

The technique of histogram flattening on the assumption that the main object as described above has a large number of edges can correspond to an object in a relatively wide range. However, the technique cannot completely correspond to the object. As an example which may correspond to the exception, a case in which a person is photographed in a relatively small size on a background having a plurality of shapes or contours is used. At this time, the background is decided as a main object to detect a large number of edges from the background portion, and a gradation range which is assigned to a person is reduced.

In a technique which performs gradation conversion to the color difference signal as described above by using a conversion coefficient equal to the conversion coefficient of a luminance signal, unnatural colors may be generated by a high-luminance portion. More specifically, color reproduction in a color space (e.g., Y, Cb, and Cr space) has a theoretical limit characteristic (see FIG. 11 showing an embodiment of the present invention). The theoretical limit characteristic of the color reproduction is a characteristic in which a color difference range in which colors can be reproduced increases as a luminance Y is increased, and a color difference range in which colors can be reproduced when the luminance exceeds the luminance Y. More specifically, a color reproduction range is narrow because the colors become blackish as a whole at a low luminance, colors in a wide range can be reproduced at an appropriate luminance, and a color reproduction range becomes narrow again because the colors become whitish as a whole at a high luminance.

When gradation conversion is performed like the case of luminance without consideration of the color reproduction range, the color reproduction range is close to or exceeds the limit of the color reproduction range, and colors after the gradation conversion may be whitish. In order to cope with the problem, a process of suppressing a saturation of a high-luminance portion is added in a conventional technique. However, it is not sufficient, and the realization of a technique of more improving color reproduction is desired.

OBJECTS AND SUMMARY OF THE INVENTION

It is an object of the present invention to provide an image processing apparatus being capable of adaptively adjusting a gradation range of a main object in accordance with a photographic scene.

It is another object of the present invention to provide an image processing apparatus being capable of adjusting a more optimum saturation in consideration of the theoretical limit characteristic of color reproduction.

In short, the present invention is directed to an image processing apparatus, for adjusting a gradation range of an input image, including: photographing condition estimation means for estimating a photographing condition of the input image; and gradation correction means for performing gradation correction on the input image on the basis of the photographing condition to adjust the gradation range to a predetermined gradation range.

The present invention is also directed to an image processing apparatus, for adjusting a gradation range of an input image, including: luminance-color difference separation means for separating the input image into a luminance signal and a color difference signal; gradation correction means for performing gradation correction on the luminance signal to adjust the gradation range to a predetermined gradation range; color difference correction means for correcting the color difference signal on the basis of a luminance signal obtained before the gradation correction and output from the luminance-color difference separation means, a luminance signal obtained after the gradation correction, and a theoretical limit characteristic of color reproduction; and luminance-color difference synthesis means for synthesizing the luminance signal obtained after the gradation correction and a color difference signal obtained after the correction into an image signal.

Furthermore, the present invention is also directed to an image processing apparatus for adjusting a gradation range of an input image, including: photographing condition estimation means for estimating a photographing condition of the input image; luminance-color difference separation means for separating the input image into a luminance signal and a color difference signal; gradation correction means for performing gradation correction on the luminance signal on the basis of the photographing condition to adjust the gradation range to a predetermined gradation range; color difference correction means for performing correction on the color difference signal on the basis of a luminance signal obtained before the gradation correction and output from the luminance-color difference separation means, a luminance signal obtained after gradation correction and output from the gradation correction means, and a theoretical limit characteristic of color reproduction; and luminance-color difference synthesis means for synthesizing an image signal on the basis of the luminance signal obtained after the gradation correction and a color difference signal obtained after the correction.

The present invention is also directed to an image processing apparatus for processing an image group comprising a plurality of images obtained by image pickup to the same object under different exposure conditions to generate one wide dynamic range image, including: photographing condition estimation means for estimating a photographing condition; extraction means for extracting an appropriate exposure region on the basis of an image signal level of each image in the image group; gradation correction means for performing gradation correction on the appropriate exposure region on the basis of the photographing condition; and synthesis means for synthesizing appropriate exposure regions subjected to gradation correction by the gradation correction means to generate one wide dynamic range image.

In addition, the present invention is directed to an image processing apparatus for processing an image group comprising a plurality of images obtained by image pickup to the same object under different exposure conditions to generate one wide dynamic range image, including: luminance-color difference separation means for separating an image signal of each image in the image group into a luminance signal and a color difference signal; extraction means for extracting an appropriate exposure region on the basis of a signal level of the luminance signal; gradation correction means for performing gradation correction on a luminance signal of the appropriate exposure region; color difference correction means for performing correction on a color difference signal of the appropriate exposure region on the basis of a luminance signal obtained before the gradation correction and output from the luminance-color difference separation means, a luminance signal obtained after gradation correction and output from the gradation correction means, and a theoretical limit characteristic of color reproduction; luminance-color difference synthesis means for synthesizing an image signal on the basis of the luminance signal obtained after the gradation correction and a color difference signal obtained after the correction; and synthesis means for synthesizing the synthesized image signal of the appropriate exposure regions to generate one wide dynamic range image.

The present invention is still further directed to an image processing apparatus for processing an image group comprising a plurality of images obtained by image pickup to the same object under different exposure conditions to generate one wide dynamic range image, including: photographing condition estimation means for estimating a photographing condition; luminance-color difference separation means for separating an image signal of each image in the image group into a luminance signal and a color difference signal; extraction means for extracting an appropriate exposure region on the basis of a signal level of the luminance signal; gradation correction means for performing gradation correction on the luminance signal of the appropriate exposure region on the basis of the photographing condition; color difference correction means for performing correction on a color difference signal of the appropriate exposure region on the basis of a luminance signal obtained before the gradation correction and output from the luminance-color difference separation means, a luminance signal obtained after gradation correction and output from the gradation correction means, and a theoretical limit characteristic of color reproduction; luminance-color difference synthesis means for synthesizing an image signal on the basis of the luminance signal obtained after the gradation correction and a color difference signal obtained after the correction; and synthesis means for synthesizing the synthesized image signal of the appropriate exposure regions to generate one wide dynamic range image.

In addition, the present invention is directed to a recording medium on which a process program executed by a computer is recorded, wherein the process program adjusts a gradation range of an input image and includes the step of separating the input image into a luminance signal and a color difference signal; the step of performing gradation correction on the luminance signal to adjust the gradation range to a predetermined gradation range; the step of performing correction on the color difference signal on the basis of a luminance signal obtained before the gradation correction, a luminance signal obtained after the gradation correction, and a theoretical luminance characteristic of color reproduction; and the step of synthesizing an image signal on the basis of the luminance signal obtained after gradation correction and a color difference signal obtained after the correction.

The present invention is also directed to a recording medium on which a process program executed by a computer is recorded, wherein the process program processes an image group comprising a plurality of images obtained by image pickup performed to the same object under different exposure conditions to generate one wide dynamic range image and includes: the step of separating an image signal of each image in the image group into a luminance signal and a color difference signal; the step of extracting an appropriate exposure region on the basis of a signal level of the luminance signal; the step of performing gradation correction on a luminance signal of the appropriate exposure region; the step of performing correction on a color difference signal of the appropriate exposure region on the basis of a luminance signal obtained before the gradation correction, a luminance signal obtained after gradation correction, and a theoretical limit characteristic of color reproduction; the step of synthesizing an image signal on the basis of the luminance signal obtained after the gradation correction and a color difference signal obtained after the correction; and the step of synthesizing the synthesized image signal of the appropriate exposure regions to generate one wide dynamic range image.

These objects and advantages of the present invention will become further apparent from the following detailed explanation.

BRIEF DESCRIPTION OF THE DRAWINGS

FIG. 4 is a diagram showing an example of a divisional pattern for an evaluation photometric operation in the first embodiment.

FIG. 5 is a table showing a classification pattern of scenes from AF information and AE information in the first embodiment.

FIGS. 6A to 6F are diagrams showing weight coefficients obtained in edge histogram calculation on the basis of the classification pattern shown in FIG. 5 in the first embodiment.

FIG. 7 is a flow chart showing an image conversion process in the first embodiment.

FIG. 9 is a block diagram showing a detailed configuration of a luminance correction unit according to the second embodiment.

FIG. 10 is a block diagram showing a detailed configuration of a color difference correction unit according to the second embodiment.

FIG. 19 is a block diagram showing a basic configuration of an electronic camera according to the fifth embodiment of the present invention.

FIG. 20 is a block diagram showing a detailed configuration of a luminance correction unit according to the fifth embodiment.

FIG. 21 is a block diagram showing a detailed configuration of a color difference correction unit according to the fifth embodiment.

DETAILED DESCRIPTION OF THE PREFERRED EMBODIMENTS

Embodiments of the present invention will be described below with reference to the accompanying drawings.

Figure 1:
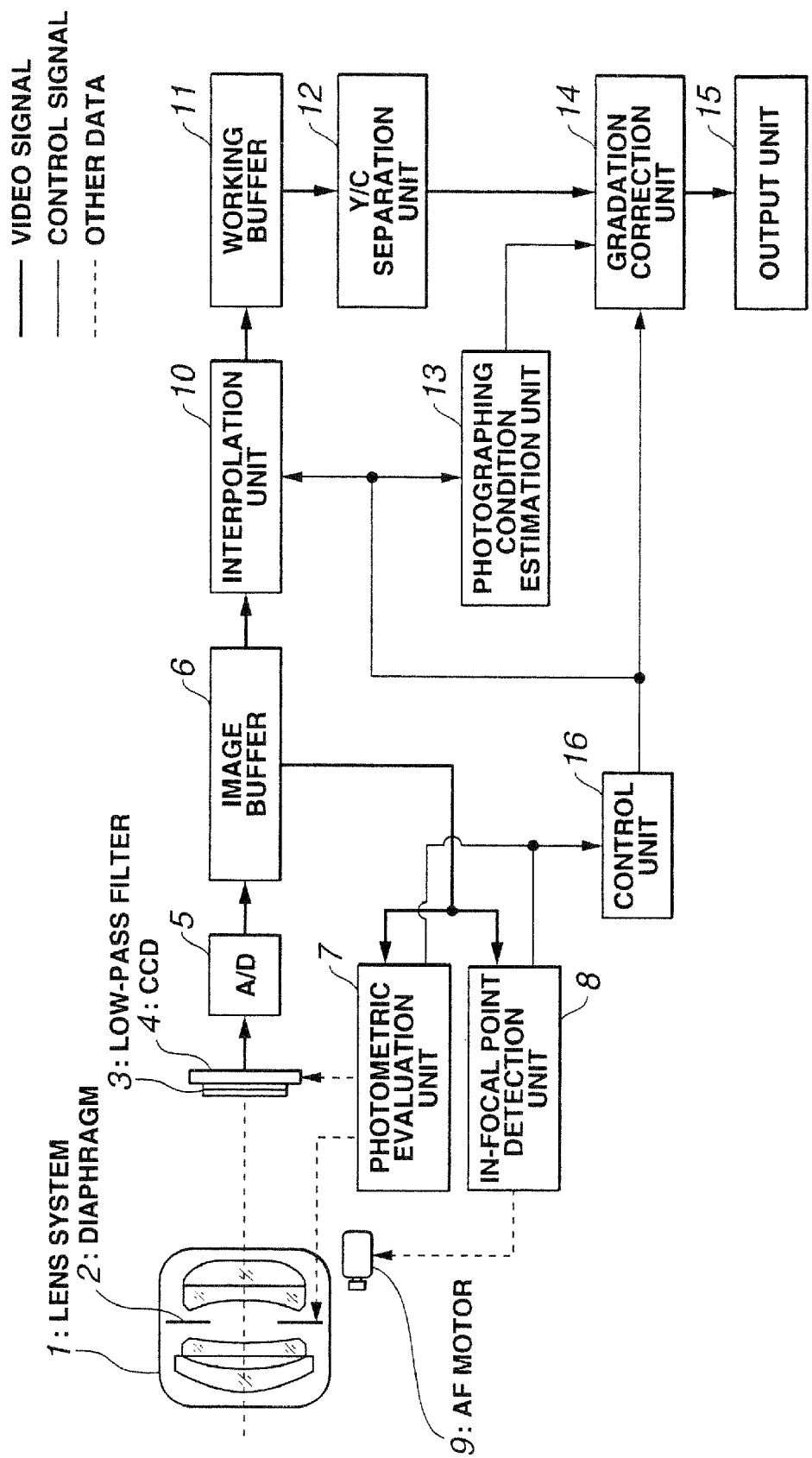
FIG. 1 is a block diagram showing a basic configuration of an electronic camera according to the first embodiment of the present invention.

FIGS. 1 to 7 show the first embodiment of the present invention, wherein FIG. 1 is a block diagram showing a basic configuration of an electronic camera.

This embodiment is obtained by applying an image processing apparatus for adjusting a gradation range according to the present invention to an electronic camera.

This electronic camera comprises: a CCD 4 comprising a color CCD or the like of a single CCD type having an electronic shutter function or the like and for photoelectrically converting an object image as an image signal; a lens system 1 for focusing the object image on the CCD 4; a diaphragm 2 for controlling a passing range of a flux of light passing through the lens system 1; a low-pass filter 3 comprising an optical filter for removing an unnecessary high-frequency component from the flux of light passing through the diaphragm 2; an A/D converter 5 for converting an analog image signal which is output from the CCD 4, from which a noise component is removed by a correlative duplex sampling circuit or the like (not shown), and which is subjected to amplification into a digital signal; an image buffer 6 for storing image data of one screen digitized by the A/D converter 5; a photometric evaluation unit 7 for reading image data from the image buffer 6 to calculate a luminance distribution and for controlling the aperture diameter of the diaphragm 2 and the electronic shutter of the CCD 4 such that an appropriate exposure is obtained in a photographing state; a focal point detection unit 8 for reading image data from the image buffer 6 to detect a focal position and for controlling an AF motor 9 (to be described later) on the basis of the detection result; an AF motor 9 controlled by the focal point detection unit 8 to drive an AF lens of the lens system 1 and for focusing an object image on the CCD 4; an interpolation unit 10 for interpolating image data of a single CCD read from the image buffer 6 and converting tree-CCD image data; an operation buffer 11 for storing the image data after interpolation; a Y/C separation unit 12 serving as a luminance-color difference separation means for separating three-CCD image data read from the operation buffer 11 into a luminance signal Y and color difference signals Cb and Cr; a photographing condition estimation unit 13 serving as a photographing condition estimation means for estimating a photographing condition (as will be described below) on the basis of photometric information output from the photometric evaluation unit 7 and focal information output from the focal point detection unit 8; a gradation correction unit 14 serving as a gradation correction means for reading a luminance signal Y from the Y/C separation unit 12 to extract an edge component, for performing weighting used when the histogram of an edge which is an amount of information is calculated with reference to the estimation result obtained by the photographing condition estimation unit 13 to calculate a conversion characteristic, and for performing gradation conversion of the luminance signal Y and the color difference signals Cb and Cr output from the Y/C separation unit 12; an output unit 15 for converting an image the gradation range of which is adjusted by the gradation correction unit 14 into the original RGB signal or the like and then outputting the RGB signal to, e.g., a recording medium or a display device; and a control unit 16 for receiving detection results of the photometric evaluation unit 7 and the focal point detection unit 8 and controlling the entire electronic camera including the interpolation unit 10, the photographing condition estimation unit 13, and the gradation correction unit 14.

Figure 2:
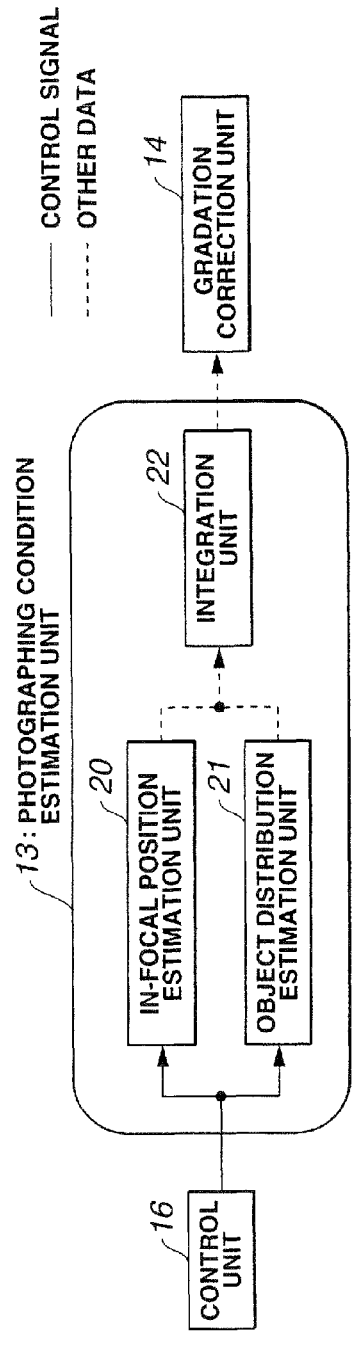
FIG. 2 is a block diagram showing a detailed configuration of a photographing condition estimation unit according to the first embodiment.

FIG. 2 is a block diagram showing the detailed configuration of the photographing condition estimation unit 13.

The focal (AF) information output from the focal point detection unit 8 and input through the control unit 16 is input to a focal position estimation unit 20 serving as a focal position estimation means and classified into one of three types (see FIG. 5), e.g., a scenic photographing operation (5 m to ∞), a portraiture photographing operation (1 m to 5 m), and a close-up photographing operation (1 m or less) according to an object distance.

The photometric (AE) information output from the photometric evaluation unit 7 and input through the control unit 16 is input to an object distribution estimation unit 21 serving as an object distribution estimation means, and the luminance distributions of the photometric information are classified into several types.

More specifically, the photometric evaluation unit 7 classifies regions on the CCD 4 into 13 regions as shown in, e.g., FIG. 4, to perform a divisional photometric operation. FIG. 4 is a diagram showing a divisional pattern for an evaluation photometric operation.

That is, the central region, the left adjacent region, and the right adjacent region of the centermost portion are represented by $a_1$, $a_2$, and $a_3$, respectively.

In addition, the upper and lower regions of the region $a_1$ in an inner peripheral portion surrounding the centermost portion are represented by $a_4$ and $a_5$, the left and right regions of the region $a_4$ are represented by $a_6$ and $a_7$, and the left and right regions of the region $a_5$ are represented by $a_8$ and $a_9$.

The upper left region, the upper right region, and the lower left region, and the lower right region in an outer peripheral portion surrounding the inner peripheral portion are represented by $a_{10}$, $a_{11}$, $a_{12}$, and $a_{13}$.

In a divisional photometric operation using these regions, the object distribution estimation unit 21 calculates the following evaluation parameters:

$$S_1 = |a_2 - a_3|$$ [Equation 1]

$$S_2 = \max(|a_4 - a_6|, |a_4 - a_7|)$$ [Equation 2]

$$S_3 = \max(a_{10}, a_{11}) - Av$$

$$Av = (\sum a_i)/13$$ [Equation 3]

More specifically, the evaluation parameter $S_1$ indicates the difference between the luminances of the left and right regions of the centermost portion, the evaluation parameter $S_2$ indicates a large one of the differences between the luminances of the upper central region and the upper left and upper right regions of the inner peripheral portion, and the evaluation parameter $S_3$ indicates the difference between a large one of the luminances of the upper left and upper right regions of the outer peripheral portion and an average luminance of an entire screen.

These evaluation parameters are obtained from the object distribution estimation unit 21, and classification of the focal positions is obtained by the focal position estimation unit 20, so that integral classification as shown in FIG. 5 is performed in the integration unit 22 serving as an integration means.

FIG. 5 is a table showing a classification pattern of scenes on the basis of AF information and AE information.

As shown in FIG. 5, when the AF information indicates 5 m to ∞, a scenic photographing operation is defined, and the evaluation parameter $S_3$ is compared with a predetermined value $Th_1$. At this time, when the evaluation parameter $S_3$ is larger than the predetermined value $Th_1$, at least one of the regions $a_{10}$ and $a_{11}$ has a luminance which is equal to or larger than the average luminance of the entire screen to some extent. For this reason, the photographing operation is determined as a photographing operation for a landscape containing sky on the upper side (Type 1). On the other hand, when the evaluation parameter $S_3$ is smaller than the predetermined value $Th_1$, the photographing operation is determined as a photographing operation for a landscape containing no sky on the upper side or a landscape containing slight sky on the upper side (Type 2).

When the AF information indicates 1 m to 5 m, a portraiture photographing operation is determined, and the evaluation parameter $S_2$ is compared with a predetermined value $Th_2$. At this time, when the evaluation parameter $S_2$ is larger than the predetermined value $Th_2$, the photographing operation is determined as a photographing operation for a portrait of a single person (Type 3). When the evaluation value $S_2$ is smaller than the predetermined value $Th_2$, the photographing operation is determined as a photographing operation for a portrait of plural persons (Type 4).

In addition, when the AF information indicates 1 m or less, the photographing operation is determined as a close-up photographing operation, and the evaluation parameter $S_1$ is compared with a predetermined value $Th_3$. At this time, when the evaluation parameter $S_1$ is larger than the predetermined value $Th_3$, the photographing operation is determined as a close-up photographing operation for a single subject (Type 5). On the other hand, when the evaluation parameter $S_1$ is smaller than the predetermined value $Th_3$, the photographing operation is a close-up photographing operation for plural subjects (Type 6).

Results obtained by classifying the scenes into these types are output from the integration unit 22 to the gradation correction unit 14.

Figure 3:
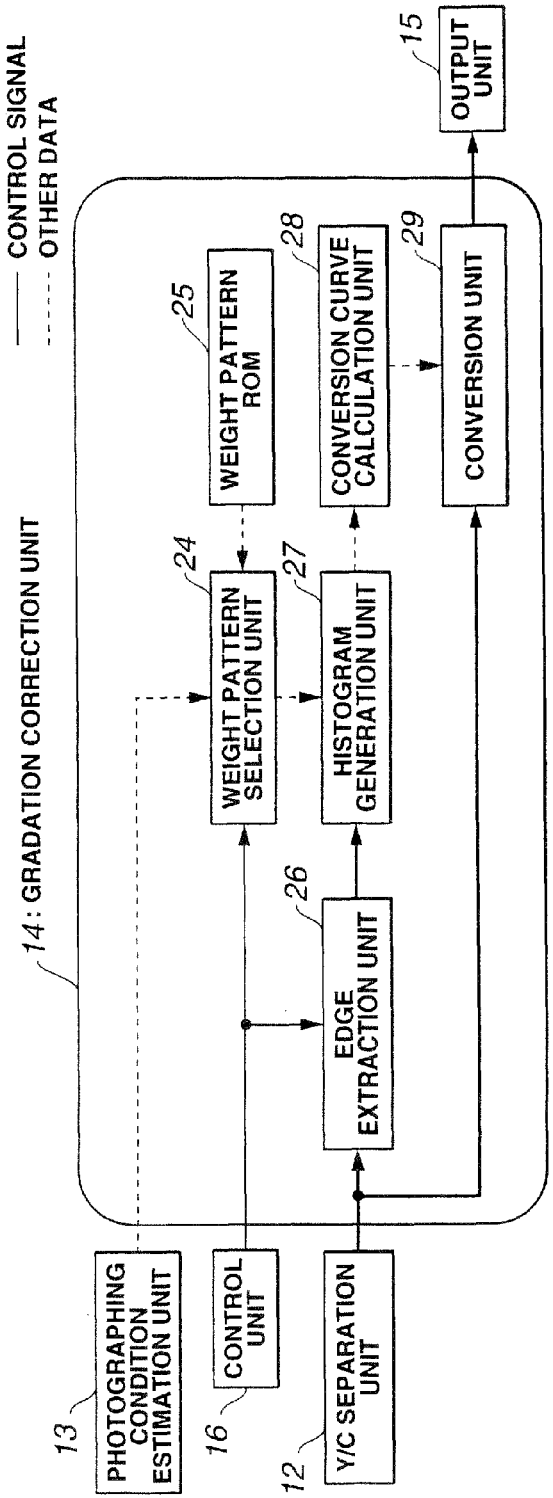
FIG. 3 is a block diagram showing a detailed configuration of a gradation correction unit according to the first embodiment.

Subsequently, FIG. 3 is a block diagram showing a detailed configuration of the gradation correction unit 14.

When a luminance signal Y from the Y/C separation unit 12 is input to the edge detection unit 26 serving as a characteristic amount calculation means, an edge detection unit 26 performs edge detection on the basis of the control of the control unit 16. More specifically, the edge detection unit 26 comprises a general edge detection operator such as a Laplacian or a Sobel. When the strength obtained by the edge detection operator is equal to or larger than a predetermined threshold value, binary information representing that an edge exists at a reference position is output. Otherwise, the binary information represents that no edge exists at the reference position.

On the other hand, when the results classified into types by the photographing condition estimation unit 13 are input to a pattern selection unit 24 serving as a selection means, the pattern selection unit 24 based on the control unit 16 selects a weight pattern depending on a type from a weight pattern ROM 25 in which a plurality of weight patterns as shown in FIG. 6A to 6F are stored in advance. FIGS. 6A to 6F are diagrams showing weight coefficients obtained in histogram calculation based on the classification pattern shown in FIG. 5. FIG. 6A shows a weight pattern corresponding to the Type 1, FIG. 6B shows a weight pattern corresponding to the Type 2, FIG. 6C shows a weight pattern corresponding to the Type 3, FIG. 6D shows a weight pattern corresponding to the Type 4, FIG. 6E shows a weight pattern corresponding to the Type 5, and FIG. 6F shows a weight pattern corresponding to the Type 6.

In this manner, a histogram generation unit 27 serving as a histogram generation means calculates an edge histogram representing an appearance frequency for luminance levels with respect to pixels constituting an edge and pixels near these pixels on the basis of the results output from the edge detection unit 26. When the histogram is generated, the histogram is calculated such that weight corresponding to pixel positions in an image as shown in FIGS. 6A to 6F. In addition, in the histogram generation unit 27, the calculated edge histogram is integrated to be converted into an accumulated edge histogram.

In a conversion curve calculation unit 28 serving as a gradation conversion curve calculation means, an edge histogram is convoluted by using a gaussian kernel or the like to generate a target histogram. By using the target histogram and the accumulated edge histogram output from the histogram generation unit 27, a tone curve serving as a gradation correction characteristic is calculated.

The conversion unit 29 serving as a conversion means performs gradation correction based on a tone curve obtained by the conversion curve calculation unit 28 to image data input from the Y/C separation unit 12, and image data after the gradation correction is output to an output unit 15. In this conversion unit 29, gradation correction of the luminance signal Y is performed, and gradation corrections of the color difference signals Cb and Cr are sequentially performed. The obtained signals are output to the output unit 15.

The output unit 15 receives the luminance signal Y and the color difference signals Cb and Cr subjected to gradation correction on generate, e.g., an original RGB signal and to output the original RGB signal.

FIG. 7 is a flow chart showing an image conversion process.

An object image focused on the CCD 4 comprising a single CCD is converted into an image signal by a photographing operation to output the image signal.

This image signal is converted into a digital signal by the A/D converter 5 and is then temporarily stored in the image buffer 6.

The photometric evaluation unit 7 and the focal point detection unit 8 output AE information and AF information to the control unit 16, as described above, on the basis of the image data accumulated in the image buffer 6 (step S1).

On the other hand, the image data stored in the image buffer 6 is transmitted to the interpolation unit 10 and interpolated with respect to R image data, G image data, and B image data. The image data is converted into three-CCD image data (step S2), and the three-CCD image data is stored in the operation buffer 11.

In the Y/C separation unit 12, RGB image data is read from the operation buffer 11 to calculate the luminance signal Y and the color difference signals Cb and Cr as expressed by the following Equation 4 (step S3):

$Y=0.29900R+0.58700G+0.14400B$ $Cb=-0.16874R-0.33126G+0.50000B$ $Cr=0.50000R-0.41869G-0.08131B$ [Equation 4]

The gradation correction unit 14, in the edge detection unit 26, operates a known quadratic differential filter such as a Laplacian to the luminance signal Y to extract an edge component (step S4). A threshold value which is about twice a standard deviation is set for the extracted edge component to perform a binarizing process (step S5).

On the other hand, in the photographing condition estimation unit 13, the above photographing condition is estimated on the basis of the AF information and the AE information (step S6), and one of Type 1 to Type 6 corresponding to a weight pattern is selected (step S7). A weight coefficient corresponding to the selected weight pattern as shown in FIGS. 6A to 6F is read from the weight pattern ROM 25 (step S8).

An edge histogram is formed by the histogram generation unit 27 on the basis of the edge component binarized in step S5 and the weight pattern read in step S8 (step S9). From the edge histogram, an accumulated edge histogram is generated (step S10).

On the basis of the edge histogram obtained as described above, the conversion curve calculation unit 28 calculates a gradation conversion curve (step S11). In the subsequent conversion unit 29, the luminance signal Y and the color difference signals Cb and Cr output from the Y/C separation unit 12 are subjected to a conversion process by the gradation conversion curve obtained by the conversion curve calculation unit 28 (step S12), so that the converted image data is output (step S13).

Although both the photometric information and the focal information are used to estimate the photographing conditions in the above description, the photographing condition may be estimated by using only one of the photometric information and the focal information to change weighting. If not only the photometric information and the focal information are used, but also one or more of zoom position information, multi-spot photometric information, line-of-sight input information, emission information of an strobe flash, information of a detection sensor for detecting the vertical and horizontal positions of an electronic camera, and white balance information are referred to, a photographing condition can be more exactly estimated.

In addition, the above described technique of gradation correction depending on the photographing condition is applied to not only a color image but also a black-and-white image.

In this first embodiment, gradation correction depending on a photographing condition is performed by the image processing apparatus which is included as a circuit in an electronic camera. However, these processes can also be performed by a process program of a computer. In this case, photographing information such as photometric information and focal information is recorded on, e.g., a header portion of an image file in a computer, a photographing condition is estimated on these pieces of photographing information, so that gradation correction appropriate to the photographing condition may be performed.

The image processing apparatus is not only applied to an electronic camera, but also popularly applied to devices such as printer devices which handle images.

According to the first embodiment, a photographing condition is decided on the basis of photographing information such as focal information and photometric information, and weighting depending on the photographing condition is performed when an edge histogram is formed. For this reason, gradation correction which is maximally appropriate to a photographing scene can be performed in consideration of a main object.

Figure 8:
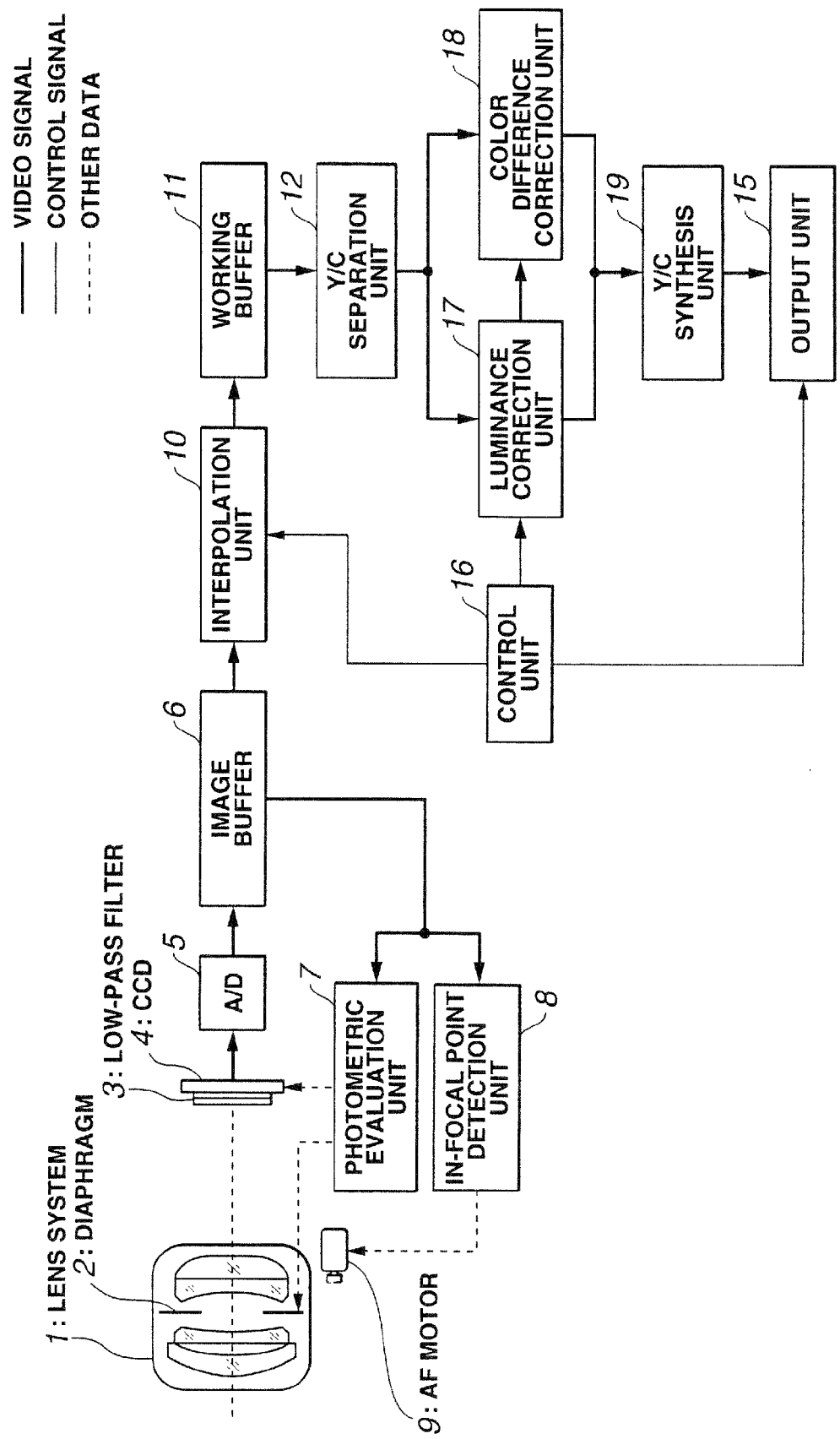
FIG. 8 is a block diagram showing a basic configuration of an electronic camera according to the second embodiment of the present invention.
Figure 11:
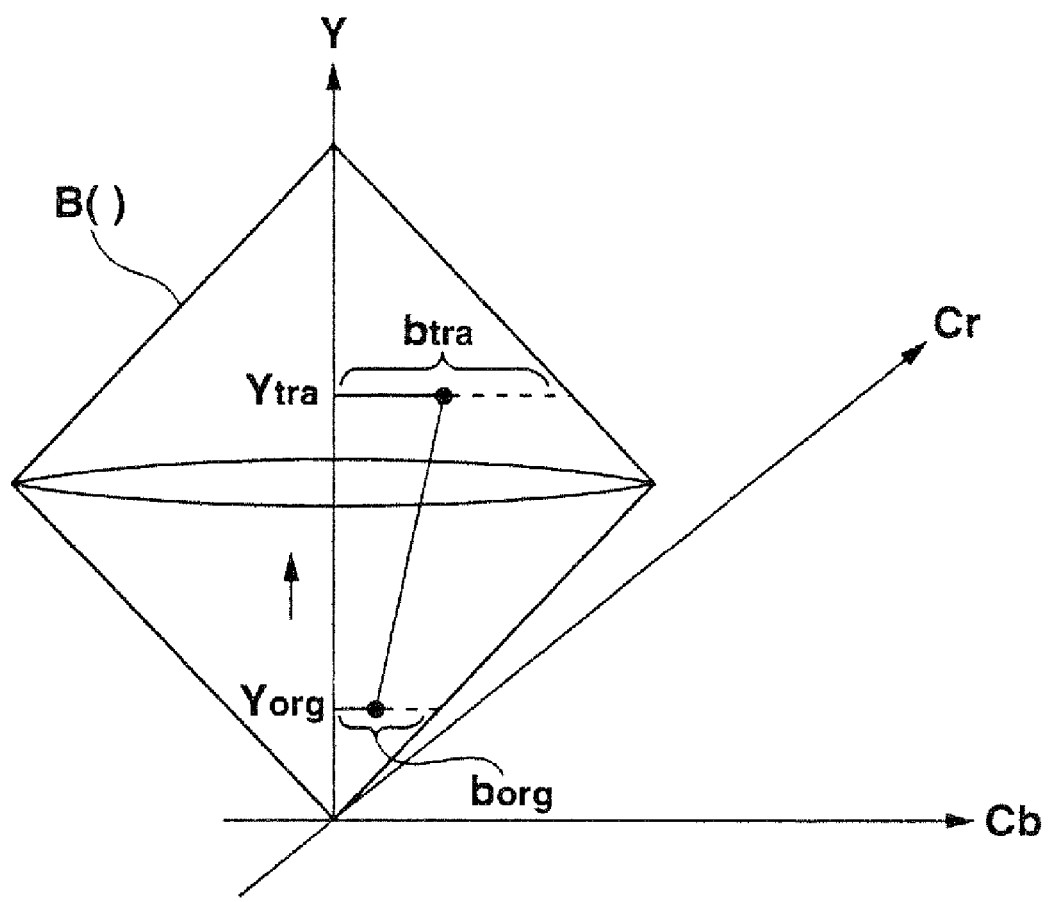
FIG. 11 is a graph showing a manner for performing color difference correction in consideration of a theoretical limit characteristic of color reproduction in the second embodiment.
Figure 12:
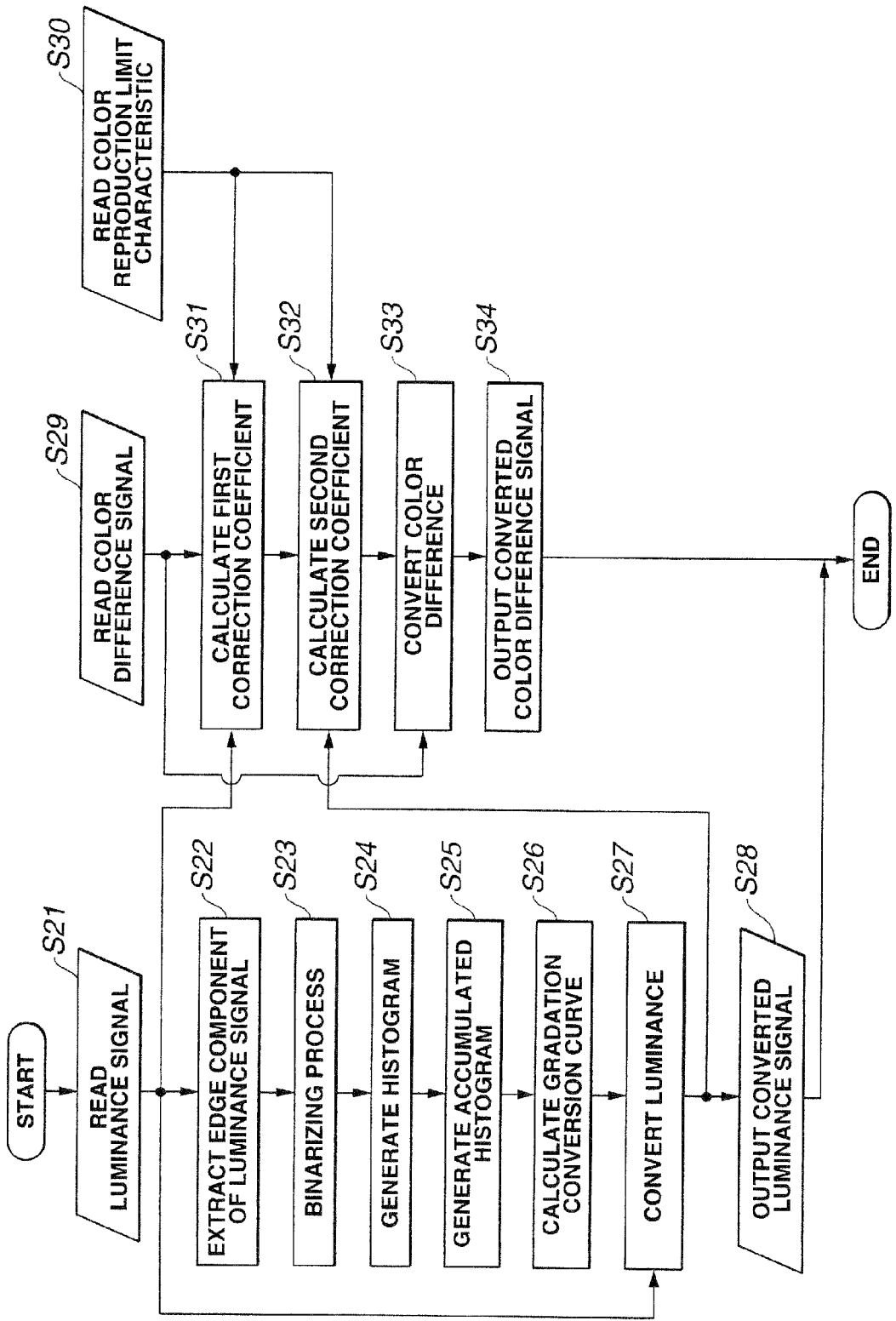
FIG. 12 is a flow chart showing an image conversion process in the second embodiment.

FIGS. 8 to 12 show the second embodiment of the present invention, wherein FIG. 8 is a block diagram showing a basic configuration of an electronic camera, FIG. 9 is a block diagram showing a detailed configuration of a luminance correction unit, FIG. 10 is a block diagram showing a detailed configuration of a color difference correction unit, FIG. 11 is a graph showing a manner for performing color difference correction in consideration of a theoretical limit characteristic of color reproduction, and FIG. 12 is a flow chart showing an image conversion process.

The same reference numerals as in the first embodiment described above denote the same parts in the second embodiment, and a description thereof will be omitted. Only different points will be mainly described below.

In the second embodiment, the luminance signal Y and the color difference signals Cb and Cr separated by the Y/C separation unit 12 are input to a luminance correction unit 17 serving as a gradation correction means and a color difference correction unit 18 serving as a color difference correction means, respectively.

The luminance correction unit 17, as shown in FIG. 9, receives the luminance signal Y output from the Y/C separation unit 12, and performs gradation correction for luminance. The luminance correction unit 17 comprises an edge extraction unit 30 serving as characteristic amount calculation means, a histogram generation unit 31 serving as a histogram generation means, a conversion curve calculation unit 32 serving as a gradation conversion curve calculation means, and a luminance conversion unit 33 serving as a luminance conversion means.

The processes in the luminance correction unit 17 will be described with reference to FIG. 12.

The luminance correction unit 17 reads the luminance signal Y output from the Y/C separation unit 12 (step S21), the edge extraction unit 30 operates a filter such as a Laplacian to extract an edge component (step S22). The edge component is compared with a predetermined threshold value with respect to pixels, and a binarizing process is conducted for determining whether a pixel is an edge or not (step S23).

On the basis of information output from the edge extraction unit 30, the histogram generation unit 31 generates an edge histogram representing an appearance frequency of an edge to a luminance (step S24), and the edge histogram is integrated to generate an accumulated edge histogram (step S25).

The conversion curve calculation unit 32 calculates a tone curve serving as a gradation correction characteristic as described above by using the accumulated edge histogram output from the histogram generation unit 31 (step S26).

The luminance conversion unit 33 performs gradation conversion to the luminance signal Y on the basis of the conversion curve under the control of the control unit 16 (step S27), outputs the converted luminance signal Y to the color difference correction unit 18, and outputs the converted luminance signal Y to a Y/C synthesis unit 19 serving as a luminance-color difference synthesis means (step S28).

In this manner, it is assumed that a luminance signal obtained before the gradation correction and output from the Y/C separation unit 12 is represented by $Y_{org}$ and that a luminance signal subjected to after the gradation correction by the luminance conversion unit 33 is represented by $Y_{tra}$. In this case, the luminance signals $Y_{org}$ and $Y_{tra}$, as described below, are used when gradation of a color difference is corrected in the color difference correction unit 18.

The color difference correction unit 18, as shown in FIG. 10, receives the color difference signals Cb and Cr output from the Y/C separation unit 12 to perform gradation correction on a color difference. The color difference correction unit 18 comprises a first correction coefficient calculation unit 37 serving as a first calculation means, a second correction coefficient calculation unit 35 serving as a second calculation means, a color reproduction limit characteristic ROM 36, and a color difference conversion unit 38 serving as a color difference conversion means.

In the color difference correction unit 18, the first correction coefficient calculation unit 37 receives a luminance signal $Y_{org}$ obtained before gradation correction from the Y/C separation unit 12, and calculates a color reproduction range $b_{org}$ corresponding to the luminance signal $Y_{org}$ as expressed in the following Equation 5 (step S31):

$$b_{org} = B(Y_{org}) \quad \text{[Equation 5]}$$

In this equation, a function B(Y) is a function representing a theoretical limit characteristic of color reproduction in a color space (Y, Cb, and Cr space), and has the following characteristic. That is, for example, as typically shown in FIG. 11, a color difference range in which color reproduction can be performed is widened as the luminance Y is increased, and the color difference range in which color reproduction can be performed is narrowed when the luminance Y exceeds a certain luminance.

The calculation as described in Equation 5 is performed such that a color reproduction range $b_{org}$ corresponding to the luminance signal $Y_{org}$ is calculated with reference to table data or the like stored in the color reproduction limit characteristic ROM 36 (step S30).

The color reproduction limit characteristic ROM 36 stores the function B(Y) representing the theoretical limit characteristic of color reproduction as table data in advance. In this case, the table data which is changed into a ROM in consideration of a load, a processing rate, and the like obtained by calculation is used. However, the table data may be obtained by actual calculation.

The second correction coefficient calculation unit 35 receives the luminance signal $Y_{tra}$ obtained after gradation correction and output from the luminance correction unit 17 to calculate a color reproduction range $b_{tra}$ corresponding to the luminance signal $Y_{tra}$ as described in the following Equation 6 which is similar to the Equation 5 described above (step S32):

$$b_{tra} = B(Y_{tra}) \quad \text{[Equation 6]}$$

The calculation described in Equation 6, similarly, is performed such that the color reproduction range $b_{tra}$ corresponding to the luminance $Y_{tra}$ is calculated with reference to table data or the like stored in the color reproduction limit characteristic ROM 36 (step S30).

The color difference conversion unit 38 calculates a conversion coefficient $gain_c$ corresponding to a color difference signal on the basis of the $b_{org}$ serving as a first correction coefficient and the $b_{tra}$ serving as a second correction coefficient as described in the following Equation 7:

$$gain_c = b_{tra}/b_{org} \quad \text{[Equation 7]}$$

In this manner, the conversion coefficient $gain_c$ corresponding to the color difference signal is defined as a ratio of the theoretical limit characteristic $b_{org}$ of color reproduction in the luminance signal $Y_{org}$ obtained before gradation correction on the theoretical limit characteristic $b_{tra}$ of color reproduction in the luminance signal $Y_{tra}$ obtained after gradation correction. For this reason, faithful color reproduction which keeps a hue can be performed without making an image monotonous as in a case using the same conversion coefficient as that used in calculation for a luminance.

When the conversion coefficient $gain_c$ is calculated, color difference signals $Cb_{org}$ and $Cr_{org}$ obtained before correction are sequentially received from the Y/C separation unit 12 (step S29), and the color difference signals $Cb_{tra}$ and $Cr_{tra}$ obtained after correction are calculated as described in the following Equation 8 (step S33).

$$Cb_{tra} = gain_c \cdot Cb_{org}$$

$$Cr_{tra} = gain_c \cdot Cr_{org} \qquad \text{[Equation 8]}$$

The color difference signals $Cb_{tra}$ and $Cr_{tra}$ converted in this manner are output to the Y/C synthesis unit 19 (step S34)

In the Y/C synthesis unit 19, the luminance signal $Y_{tra}$ obtained after gradation conversion and the color difference signals $Cb_{tra}$ and $Cr_{tra}$ obtained after conversion are Y/C-synthesized to be converted into, e.g., an RGB signal. The RGB signal is output through the output unit 15 under the control of the control unit 16.

In the second embodiment, gradation correction made in consideration of a theoretical limit characteristic of color reproduction is performed by an image processing apparatus which is included as a circuit in an electronic camera. However, such these processes can be performed by a process program of a computer.

This image processing apparatus is not only applied to an electronic camera, but also popularly applied to devices such as printer devices which handle images.

According to the second embodiment, gradation correction made in consideration of a theoretical limit characteristic of color reproduction is performed to a color difference signal. For this reason, even though gradation correction of an image is performed, a hue can be kept.

Figure 13:
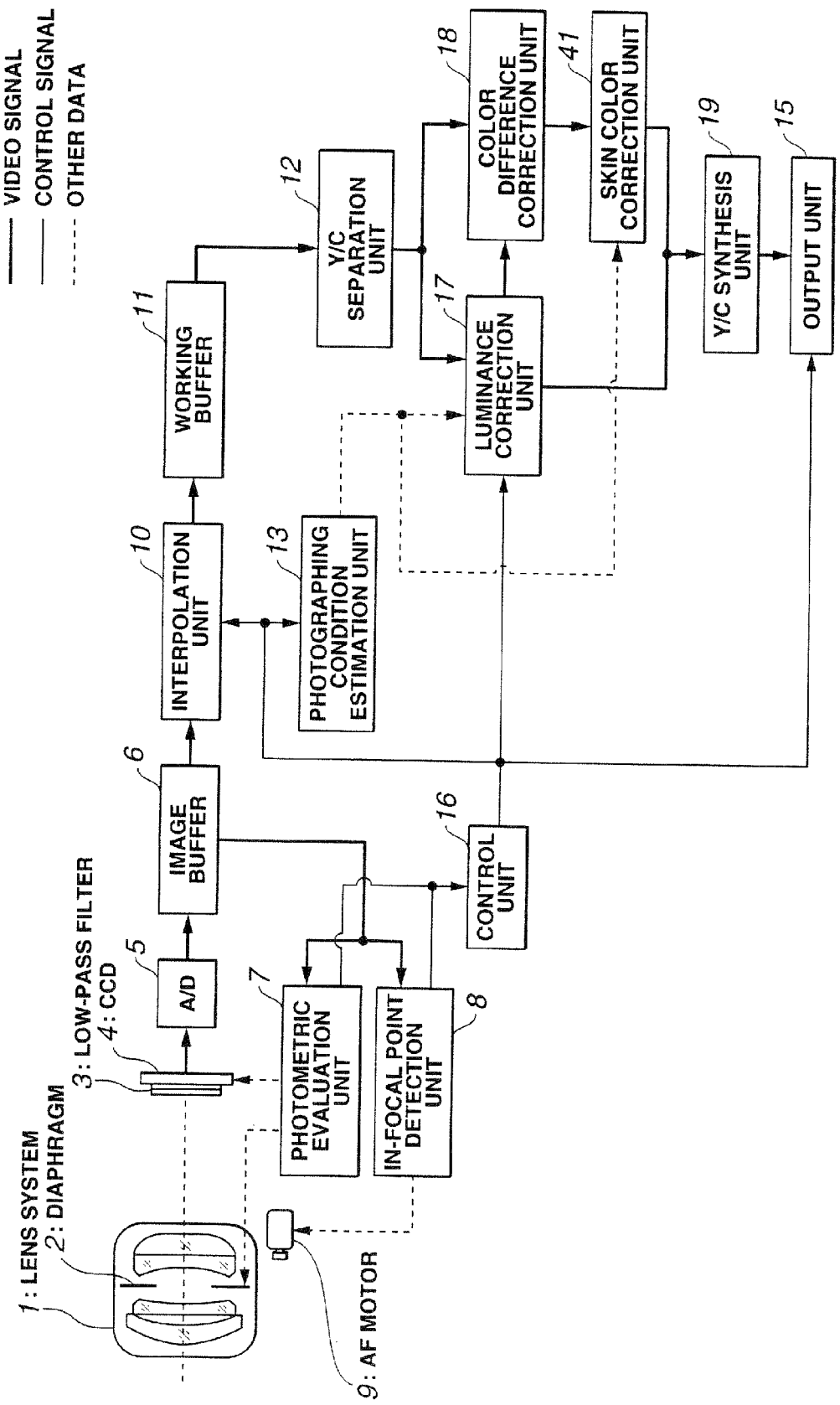
FIG. 13 is a block diagram showing a basic configuration of an electronic camera according to the third embodiment of the present invention.
Figure 14:
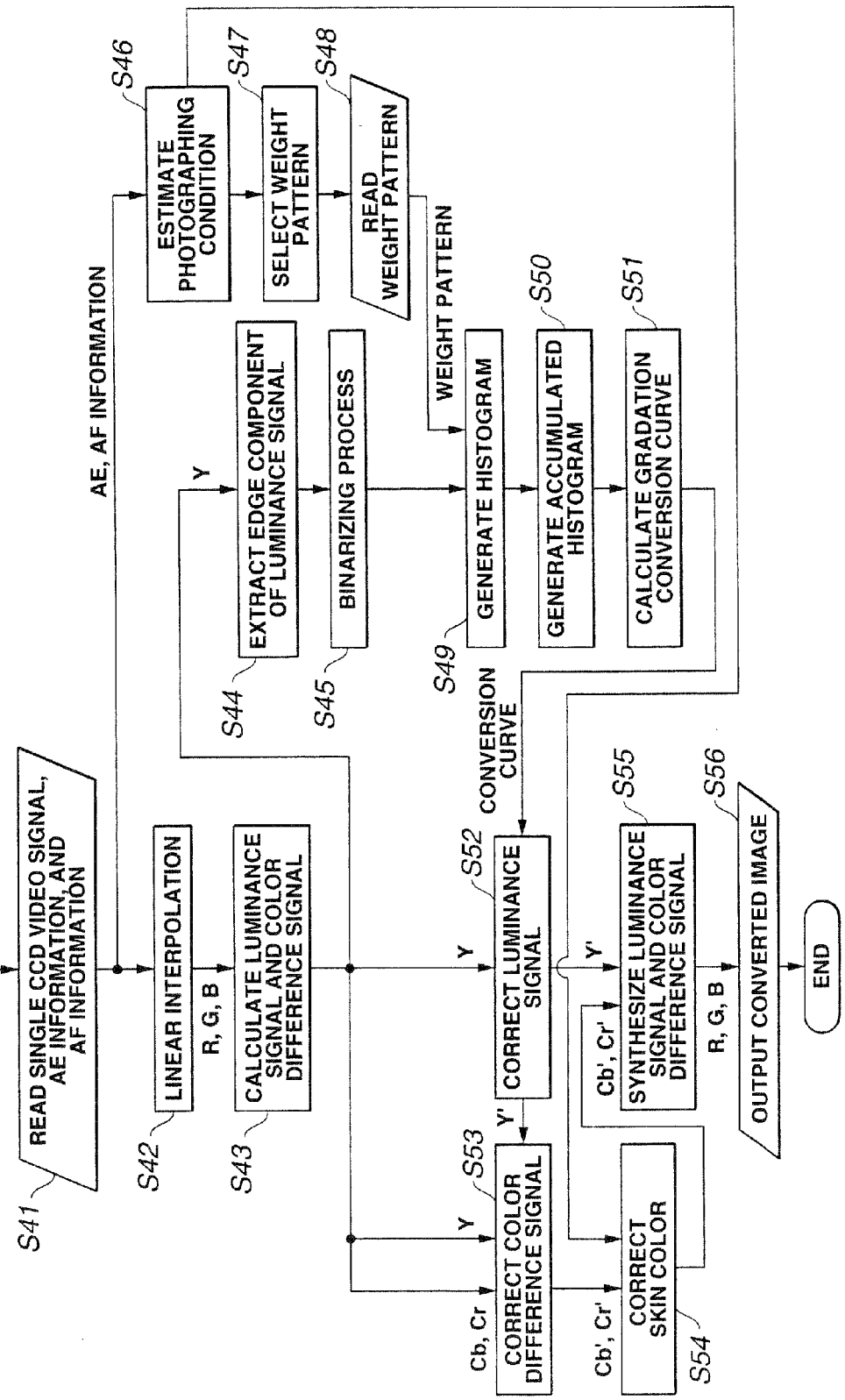
FIG. 14 is a flow chart showing an image conversion process in the third embodiment.

FIGS. 13 and 14 show the third embodiment of the present invention, wherein FIG. 13 is a block diagram showing a basic configuration of an electronic camera, and FIG. 14 is a flow chart showing an image conversion process.

The same reference numerals as in the first and second embodiments denote the same parts in the third embodiment, and a description thereof will be omitted. Only different points will be mainly described below.

The third embodiment is constituted such that a function obtained by combining the functions of the first embodiment and the second embodiment appears. More specifically, weighting depending on a photographing condition is performed when a gradation conversion characteristic of a luminance signal is calculated, a theoretical limit characteristic of color reproduction is considered when a conversion characteristic of a color difference signal is calculated, and a hue and a saturation are corrected depending on the photographing condition.

More specifically, an image signal output from the CCD 4 is converted into a digital signal by the A/D converter 5, and then the digital signal is temporarily stored in the image buffer 6.

As described above, the photometric evaluation unit 7 and the focal point detection unit 8 outputs AE information and AF information to the control unit 16 on the basis of image data accumulated in the image buffer 6 (step S41).

On the other hand, the image data stored in the image buffer 6 are sequentially transmitted to the interpolation unit 10 and interpolated with respect to R image data, G image data, and B image data to be converted into three-CCD image data (step S42). The three-CCD image data are stored in the operation buffer 11.

In the Y/C separation unit 12, RGB image data is read from the operation buffer 11, and the luminance signal Y and the color difference signals Cb and Cr are calculated as described in Equation 4 described above (step S43). The luminance correction unit 17, in the edge extraction unit 30, extracts an edge component from the luminance signal Y of these signals (step S44), and a binarizing process is performed to the extracted edge component (step S45).

On the other hand, in the photographing condition estimation unit 13, a photographing condition is estimated on the basis of the AF information and the AE information as described above (step S46), and one of Type 1 to Type 6 corresponding to a weight pattern is selected (step S47). A weight coefficient, as shown in FIGS. 6A to 6F, corresponding to the selected weight pattern is read from the weight pattern ROM 25 (step S48).

In this manner, an edge histogram weighted by the histogram generation unit 31 is generated on the basis of the edge component binarized in step S45 and a weight pattern read in step S8 (step S49), and an accumulated edge histogram is further generated from the edge histogram (step S50).

The conversion curve calculation unit 32 calculates a gradation conversion curve on the basis of the accumulated edge histogram obtained in this manner (step S51).

In the subsequent luminance conversion unit 33, the luminance signal Y output from the Y/C separation unit 12 is subjected to a conversion process by the gradation conversion curve obtained from the conversion curve calculation unit 32 (step S52). The converted luminance signal Y is output to the color difference correction unit 18 and output to the Y/C synthesis unit 19.

In the color difference correction unit 18, a first correction coefficient and a second correction coefficient are calculated as described above on the basis of a luminance signal Y' obtained after the gradation correction, the luminance signal Y obtained before the gradation correction and output from the Y/C separation unit 12, and a theoretical limit characteristic of color reproduction read from the color reproduction limit characteristic ROM 36. A conversion coefficient to a color difference signal is calculated on the basis of the first correction coefficient and the second correction coefficient. The color difference signals Cb and Cr received from the Y/C separation unit 12 are converted (step S53).

Color difference signals Cb' and Cr' corrected by the color difference correction unit 18 are input to a skin color correction unit 41 serving as a second color difference correction means to perform correction or the like of, e.g., a skin color with reference to a photographing condition estimated by the photographing condition estimation unit 13 (step S54).

In this case, when a portrait of a single person or plural persons as in Type 3 or Type 4 is used, a process of correcting a hue and a saturation is performed such that a skin color looks more preferable. For example, the skin color of a Japanese person is exemplified. That is, since Japanese skin tends to have a yellowish hue, a process of slightly shifting the yellowish hue to a reddish hue is performed.

When a landscape containing sky on the upper side as in Type 1, a process of correcting a hue and a saturation is performed such that the sky looks more blue.

In addition, when a landscape is estimated as in Type 1 or Type 2, and when it is estimated on the basis of other information that the landscape contains a large number of plants, a process of correcting a hue and a saturation may be performed to make the green of the plants preferable. The embodiment can be applied to not only the above objects, but also various other objects.

The color difference signals Cb' and Cr' corrected by the skin color correction unit 41 and the luminance signal Y' subjected to gradation correction by the luminance correction unit 17 are synthesized by the Y/C synthesis unit 19 to be converted into an original RGB signal (step S55). Thereafter, the RGB signal is output through the output unit 15 (step S56).

Also, in the third embodiment, the device operates a circuit in an electronic camera to perform gradation correction. However, these processes can also be performed by a process program of a computer.

In this case, photometric information from the photometric evaluation unit 7 and focal information from the focal point detection unit 8 are added to the header portion of a file in which image data in the image buffer 6 is stored, and the file is recorded on a recording medium such as a memory card. The file may be read by the computer to cause the computer to sequentially perform necessary parts of the processes shown in FIG. 14.

The process program is recorded on various recording media such as a hard disk in the computer, a portable floppy disk, and a photomagnetic disk.

The image processing apparatus is not only applied to an electronic camera, but also popularly applied to devices such as printer devices which handle images.

According to the third embodiment described above, both of the effect of the first embodiment described above and the effect of the second embodiment described above can be achieved. At the same time, correction of a hue and a saturation can be performed depending on a photographing condition. For this reason, the skin color of a person which is, e.g., a main object, can also be corrected into a preferable skin color.

Figure 15:
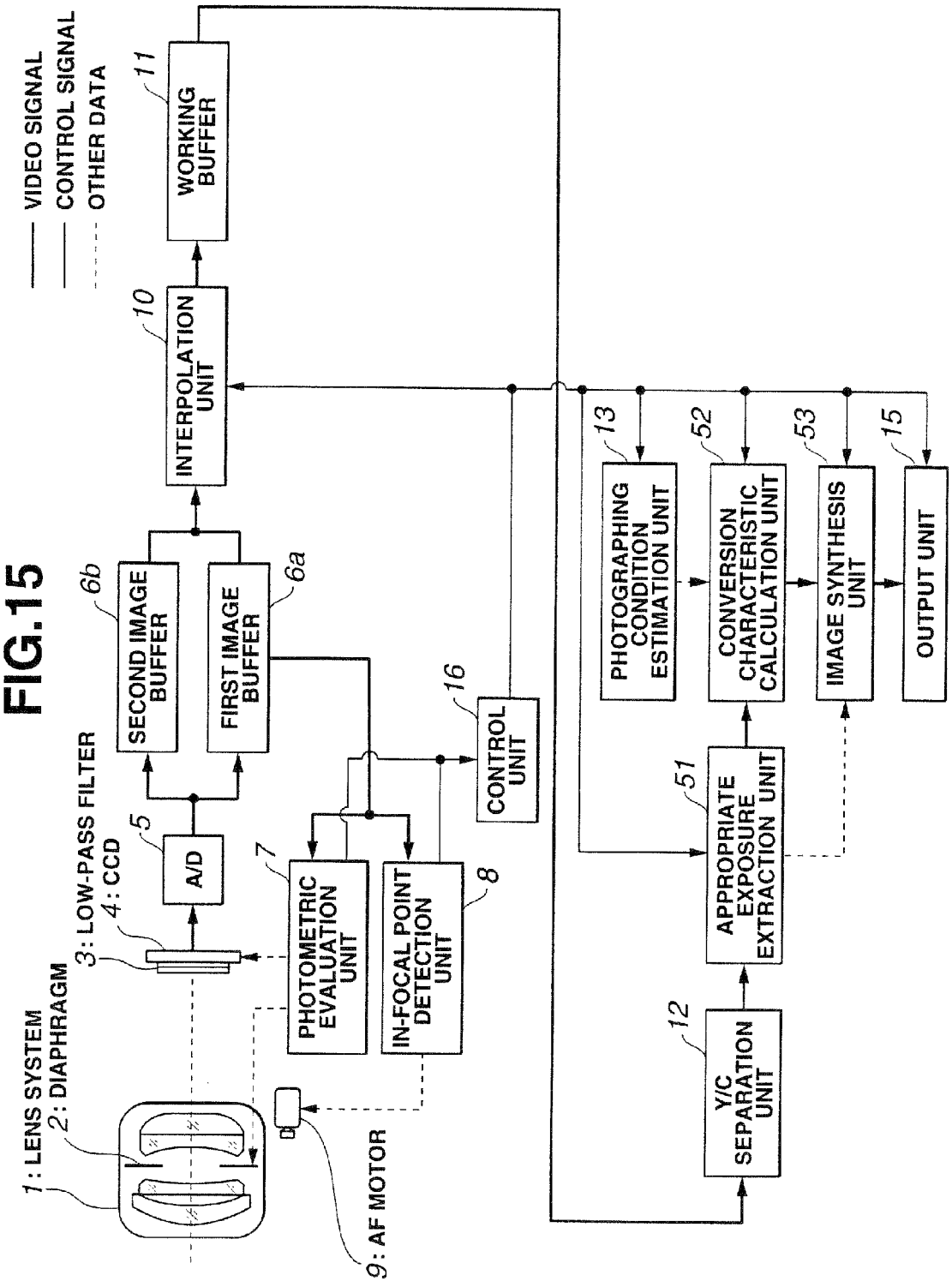
FIG. 15 is a block diagram showing a basic configuration of an electronic camera according to the fourth embodiment of the present invention.

FIGS. 15 to 18 show the fourth embodiment of the present invention, wherein FIG. 15 is a block diagram showing a basic configuration of an electronic camera.

The same reference numerals as in the first to third embodiments described above denote the same parts in the fourth embodiment, and a description thereof will be omitted. Only different points will be mainly described below.

This embodiment is obtained by applying the image processing apparatus according to the present invention to an electronic camera. For the sake of descriptive convenience, a case in which two images, i.e., an image obtained by short-period exposure and an image obtained by long-period exposure are synthesized with each other to obtain one wide dynamic range image will be described below. As a matter of course, the embodiment can also be applied to a case in which a large number of images are synthesized with each other.

This electronic camera, as shown in FIG. 15, has a configuration which is almost the same as that shown in FIG. 1. However, since the electronic camera synthesizes a plurality of images, the electronic camera is different from the electronic camera shown in FIG. 1 in the following points.

More specifically, as image buffers for accumulating image data of one screen digitized by the A/D converter 5, a first image buffer 6a for storing the image obtained by long-period exposure and a second image buffer 6b for storing the image obtained by short-period exposure are arranged.

The photometric evaluation unit 7 reads image data from the first image buffer 6a also used to accumulate data for a photometric operation and focal point detection to calculate a luminance distribution. The aperture diameter of the diaphragm 2 and the electronic shutter of the CCD 4 are controlled such that an appropriate exposure is obtained in a photographing state.

In addition, the focal point detection unit 8 reads image data from the first image buffer 6a to detect a focal position. On the basis of the detection result, the AF motor 9 is controlled.

The interpolation unit 10 interpolates single-CCD image data read from the first and second image buffers 6a and 6b to convert the image data into three-CCD image data.

The electronic camera further comprises: an appropriate exposure extraction unit 51 serving as an extraction means for reading the luminance signal Y from the Y/C separation unit 12 to decide, by a signal level, whether each of the pixels constituting the entire screen has an appropriate exposure or not, and for, on the basis of the result, extracting and outputting divisional image information; a conversion characteristic calculation unit 52 serving as a gradation correction means for performing weighting when a histogram of an edge which is a characteristic amount with reference the estimation result obtained by the photographing condition estimation unit 13 to calculate a conversion characteristic and for performing gradation conversion on the appropriate exposure region output from the appropriate exposure extraction unit 51; and an image synthesis unit 53 serving as a synthesis means for synthesizing an image related to long-period exposure and an image related to short-period exposure which are obtained after gradation conversion and output from the conversion characteristic calculation unit 52 with reference to region information output from the appropriate exposure extraction unit 51 to generate one wide dynamic range image. A wide dynamic range image synthesized by the image synthesis unit 53 is output by the output unit 15 to, e.g., a recording medium or a display device.

In addition, the control unit 16 performs control of the entire electronic camera, and also controls the appropriate exposure extraction unit 51, the conversion characteristic calculation unit 52, and the image synthesis unit 53, as a matter of course.

Figure 16:
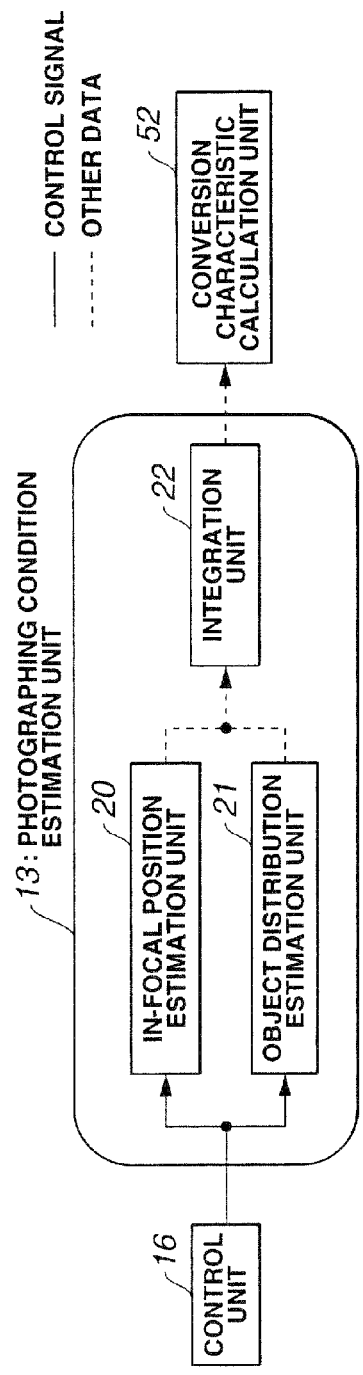
FIG. 16 is a block diagram showing a detailed configuration of a photographing condition estimation unit according to the fourth embodiment.

FIG. 16 is a block diagram showing a detailed configuration of the photographing condition estimation unit 13. The internal configuration in FIG. 16 is the same as that shown in FIG. 2. The internal configuration in FIG. 16 is different from the internal configuration in FIG. 2 only that results classified into the types described above are output from the integration unit 22 to the conversion characteristic calculation unit 52.

Figure 17:
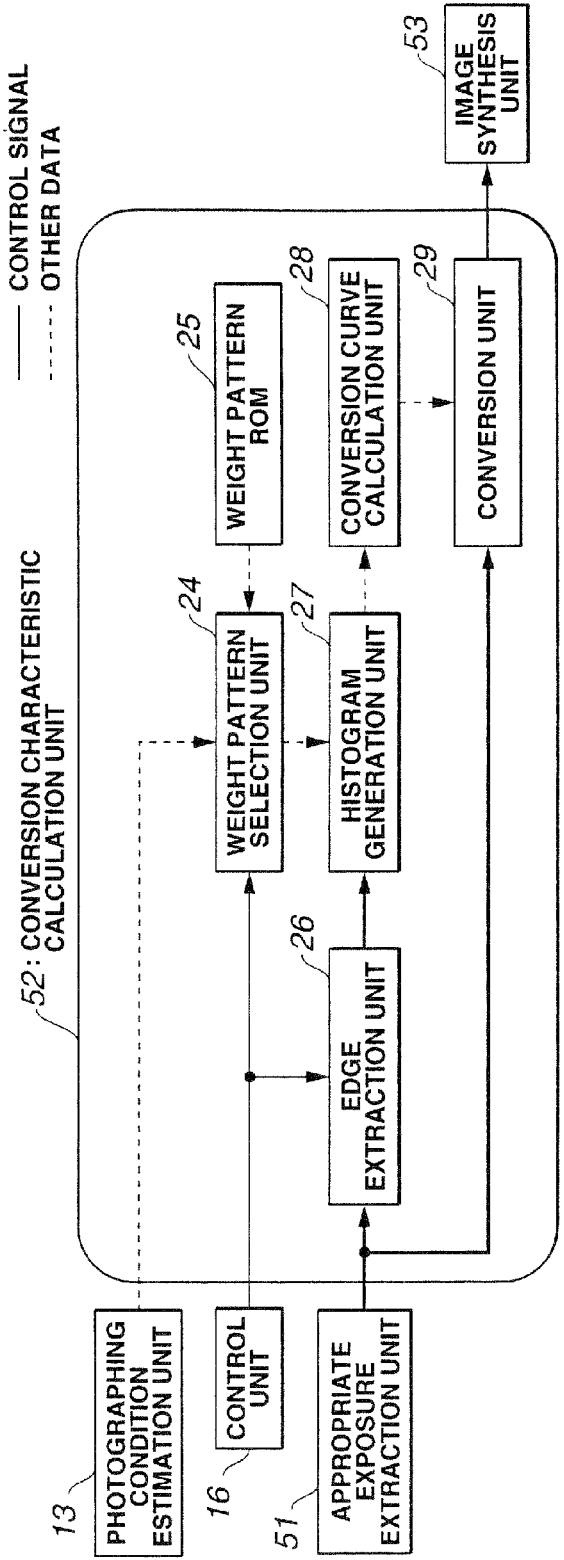
FIG. 17 is a block diagram showing a detailed configuration of a conversion characteristic calculation unit according to the fourth embodiment.

Subsequently, FIG. 17 is a block diagram showing a detailed configuration of the conversion characteristic calculation unit.

The internal configuration of the conversion characteristic calculation unit 52 is almost the same as that of the gradation correction unit 14 (see FIG. 3) in the first embodiment described above.

More specifically, as described above, the appropriate exposure extraction unit 51 reads the luminance signal Y of a long-period exposure image and compares the signal level of each of pixels constituting the entire screen with a predetermined value to decide whether the corresponding pixel has an appropriate exposure or not. A set of pixels which are determined as pixels having appropriate exposures corresponds to an appropriate exposure region related to long-period exposure, and the other portion except for the appropriate exposure region related to the long-period exposure corresponds to an appropriate exposure region related to short-period exposure.

When the luminance signal Y in the appropriate exposure region of the long-period exposure output from the appropriate exposure extraction unit 51 is input to the edge detection unit 26 serving as a characteristic amount calculation means, the edge detection unit 26 performs edge detection under the control of the control unit 16.

The other components, i.e., the pattern selection unit 24, the weight pattern ROM 25, the histogram generation unit 27, and the conversion curve calculation unit 28 have a configuration which is almost the same as that of the first embodiment described above to be operated.

In addition, the conversion unit 29 serving as a conversion means is the same as that in the first embodiment except that image data is input from the appropriate exposure extraction unit 51, and the image data obtained after gradation correction is output to the image synthesis unit 53. In the conversion unit 29, gradation correction of the luminance signal Y related to long-period exposure is performed, and gradation corrections of the color difference signals Cb and Cr related to the long-period exposure are sequentially performed to output the corrected signals to the image synthesis unit 53. Thereafter, gradation corrections of a luminance signal Y and color difference signals Cb and Cr related to short-period exposure are performed in the same manner as described above to output the corrected signals to the image synthesis unit 53.

The subsequent image synthesis unit 53 receives the luminance signal Y and the color difference signals Cb and Cr obtained after the gradation correction related to the long-period exposure to generate, e.g., an RGB signal related to the long-period exposure. The image synthesis unit 53 receives the luminance signal Y and the color difference signals Cb and Cr obtained after the gradation correction related to the short-period exposure to generate the RGB signal related to the short-period exposure. Thereafter, these signals are synthesized with each other to generate a wide dynamic range image, and the image is output.

Figure 18:
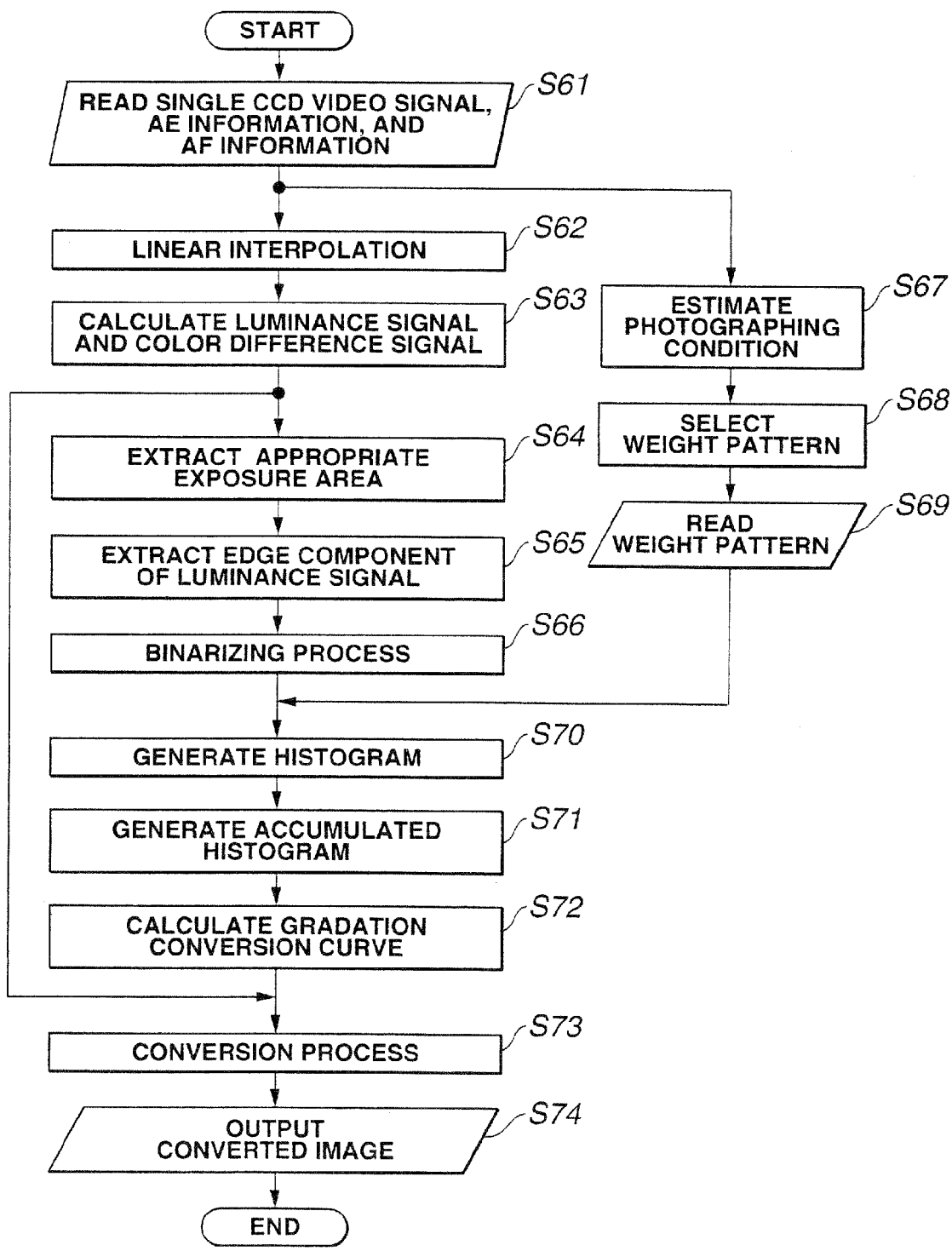
FIG. 18 is a flow chart showing an image conversion process according to the fourth embodiment.

FIG. 18 is a flow chart showing an image conversion process.

An object image focused on the CCD 4 which comprises a single CCD is designed to perform image pickup operations plural times under different exposure conditions. As described above, an image pickup operation by long-period exposure and an image pickup operation by short-period exposure are performed in this order to sequentially output signals as image signals.

These image signals are converted into digital signals by the A/D converter 5. Thereafter, the digital signals are stored in the first image buffer 6a and the second image buffer 6b, respectively.

The photometric evaluation unit 7 and the focal point detection unit 8 outputs AE information and AF information to the control unit 16 as described above on the basis of image data of long-period exposure accumulated in the first image buffer 6a which is one of these buffers (step S61).

On the other hand, the image data stored in the first image buffer 6a and the second image buffer 6b are sequentially transmitted to the interpolation unit 10 and interpolated with respect to R image data, G image data, and B image data to be converted into three-CCD image data (step S62). The three-CCD image data are stored in the operation buffer 11.

In the Y/C separation unit 12, RGB image data is read from the operation buffer 11, and the luminance signal Y and the color difference signals Cb and Cr are calculated as described in Equation 4 described above (step S63).

The appropriate exposure extraction unit 51 compares the signal level of the luminance signal Y of these signals with a predetermined threshold value with respect to pixels to decide whether the corresponding pixel belongs an appropriate exposure region or not, so that divisional image information is extracted and output (step S64).

Thereafter, the edge detection unit 26 in the conversion characteristic calculation unit 52 operates a known quadratic differential filter such as a Laplacian to the luminance signal Y to extract an edge component (step S65). A threshold value which is about twice a standard deviation is set for the extracted edge component to perform a binarizing process (step S66).

On the other hand, in the photographing condition estimation unit 13, the above photographing condition is estimated on the basis of the AF information and the AE information (step S67), and one of Type 1 to Type 6 corresponding to a weight pattern is selected as shown in FIG. 5 (step S68). A weight coefficient corresponding to the selected weight pattern as shown in FIGS. 6A to 6F is read from the weight pattern ROM 25 (step S69).

In this manner, the histogram generation unit 27 generates an edge histogram weighted by the histogram generation unit 27 on the basis of the edge component binarized in step S66 and the weight pattern read in step S69 (step S70), and an accumulated edge histogram is generated from the edge histogram (step S71).

On the basis of the accumulated edge histogram obtained as described above, the conversion curve calculation unit 28 calculates a gradation conversion curve (step S72).

In the subsequent conversion unit 29, the luminance signal Y and the color difference signals Cb and Cr output from the appropriate exposure extraction unit 51 are subjected to a conversion process by the gradation conversion curve obtained from the conversion curve calculation unit 28 (step S73), and the converted image data is output (step S74).

In the fourth embodiment, gradation correction corresponding to a photographing condition is performed by an image processing apparatus which is included as a circuit in an electronic camera. However, these processes can also be performed by a process program of a computer. In this case, photographing information such as photometric information and focal information is recorded on, e.g., the header portion of an image file. In the computer, a photographing condition may be estimated on the basis of these pieces of photographing information to perform gradation correction appropriate to the photographing condition.

The image processing apparatus is not only applied to an electronic camera, but also popularly applied to devices such as printer devices which handle images.

According to the fourth embodiment described above, as in the embodiments described above, gradation correction which is most appropriate to a photographing scene can be performed in consideration of a main object.

FIGS. 19 to 21 show the fifth embodiment of the present invention, wherein FIG. 19 is a block diagram showing a basic configuration of an electronic camera, FIG. 20 is a block diagram showing a detailed configuration of a luminance correction unit, and FIG. 21 is a block diagram showing a detailed configuration of a color difference correction unit.

The same reference numerals as in the first to fourth embodiments described above denote the same parts in the fifth embodiment, and a description thereof will be omitted. Only different points will be mainly described below.

In the fifth embodiment, a luminance signal Y and color difference signals Cb and Cr separated by the Y/C separation unit 12, as shown in FIG. 19, are input to the luminance correction unit 17 serving as a gradation correction means and the color difference correction unit 18 serving as a color difference correction means through the appropriate exposure extraction unit 51, respectively.

The luminance correction unit 17, as shown in FIG. 20, has the same configuration as that shown in FIG. 9 except that the luminance signal Y of an appropriate exposure region is received from the appropriate exposure extraction unit 51. The processes of the luminance correction unit 17 are the same as those shown in FIG. 12.

In addition, the color difference correction unit 18, as shown in FIG. 21, has the same configuration as that shown in FIG. 10 except that the first correction coefficient calculation unit 37 and the color difference conversion unit 38 receive outputs from the appropriate exposure extraction unit 51.

In the Y/C synthesis unit 19, a luminance signal $Y_{tra}$ obtained after gradation conversion and color difference signals $Cb_{tra}$, $Cb_{tra}$ obtained after conversion are Y/C-synthesized with each other to be converted into, e.g., an RGB signal, and the RGB signal is output to the image synthesis unit 53.

In the image synthesis unit 53, an appropriate exposure image portion obtained after gradation conversion related to long-period exposure and an appropriate exposure image portion obtained after gradation conversion related to short-period exposure are synthesized with each other to generate a wide dynamic range image. Thereafter, the wide dynamic range image is output from the output unit 15.

In this fifth embodiment, gradation correction made in consideration of a theoretical limit characteristic of color reproduction is performed by an image processing apparatus which is included as a circuit in an electronic camera. However, these processes can also be performed by a process program of a computer.

The image processing apparatus is not only applied to an electronic camera, but also popularly applied to devices such as printer devices which handle images.

According to the fifth embodiment, gradation correction made in consideration of a theoretical limit characteristic of color reproduction is performed to a color difference signal. For this reason, even though gradation correction of an image is performed, an appropriate hue can be kept.

Figure 22:
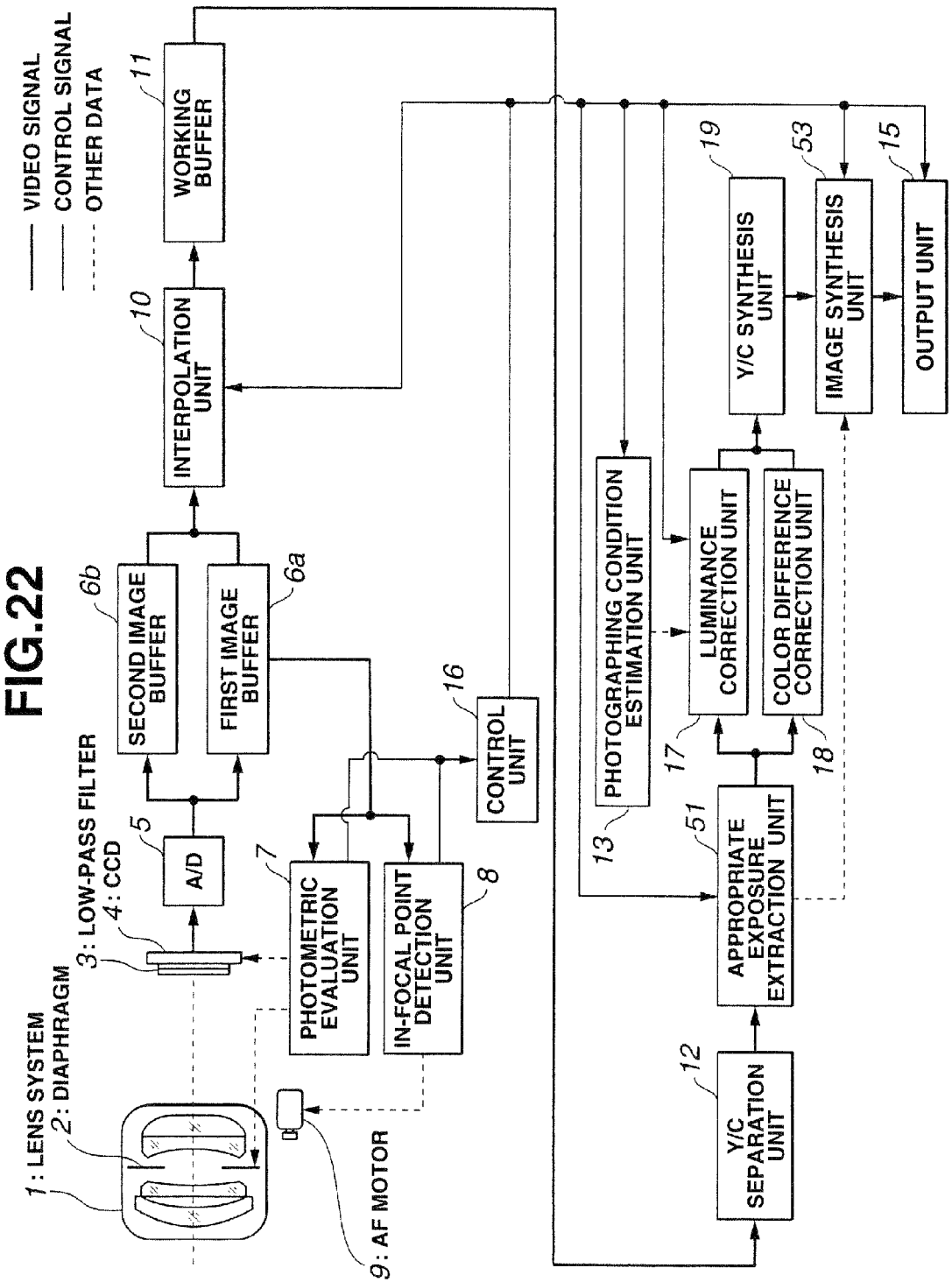
FIG. 22 is a block diagram showing a basic configuration of an electronic camera according to the sixth embodiment of the present invention.

FIG. 22 shows the sixth embodiment of the present invention, and is a block diagram showing a basic configuration of an electronic camera.

The same reference numerals as in the first to fifth embodiments denote the same parts in the sixth embodiment, and a description thereof will be omitted. Only different points will be mainly described below.

The sixth embodiment is constituted such that a function obtained by combining the functions of the fourth embodiment and the fifth embodiment appears. More specifically, weighting depending on a photographing condition is performed when a gradation conversion characteristic of a luminance signal is calculated, a theoretical limit characteristic of color reproduction is considered when a conversion characteristic of a color difference signal is calculated.

More specifically, as shown in FIG. 22, the classification results of photographing conditions as shown in FIG. 5 estimated by the photographing condition estimation unit 13 are input to the luminance correction unit 17. When an edge histogram of a luminance signal is generated in the luminance correction unit 17, weighting as shown in FIGS. 6A to 6F is performed.

When a luminance signal subjected to gradation conversion on the basis of the characteristic curve obtained as described above is input to the color difference correction unit 18, as in the fifth embodiment described above, a second correction coefficient is calculated with reference to a table showing the theoretical limit characteristic of color reproduction. Similarly, a first correction coefficient is calculated on the basis of a luminance signal obtained before gradation conversion. On the basis of the first correction coefficient and the second correction coefficient, a conversion coefficient related to a color difference signal is calculated. Conversion appropriate to a color difference is performed to output the converted coefficient to the Y/C synthesis unit 19.

In the Y/C synthesis unit 19, a luminance signal obtained after gradation conversion and output from the luminance correction unit 17 and a color difference signal obtained after conversion and output from the color difference correction unit 18 are Y/C-synthesized with each other to output the synthesized signal to the image synthesis unit 53.

In the image synthesis unit 53, an appropriate exposure image portion obtained after gradation conversion related to long-period exposure and an appropriate exposure image portion obtained after gradation conversion related to short-period exposure are synthesized with each other to generate a wide dynamic range image. The wide dynamic range image is output from the output unit 15.

Also in the sixth embodiment, gradation correction is performed by an image processing apparatus which is included as a circuit in an electronic camera. However, these processes can also be performed by a process program of a computer.

The image processing apparatus is not only applied to an electronic camera, but also popularly applied to devices such as printer devices which handle images.

According to the sixth embodiment described above, both of the effect of the fourth embodiment described above and the effect of the fifth embodiment described above can be achieved.

In this invention, it is apparent that working modes different in a wide range can be formed on the basis of this invention without departing from the spirit and scope of the invention. This invention is not restricted by any specific embodiment except being limited by the appended claims.

What is claimed is:

1. An image processing apparatus for processing an image group comprising a plurality of images obtained by imaging a same object under different exposure conditions to generate a wide dynamic range image, comprising:

a photographing condition estimation element which estimates a photographing condition;

an extraction element which extracts an appropriate exposure region from each image in the image group based on an image signal level of the image;

a gradation correction element which selects, based on the photographing condition, a weight pattern comprising a two-dimensionally-arrayed plurality of weight coefficients, and which performs gradation correction on each of the extracted appropriate exposure regions based on a state of two-dimensional arrangement of the plurality of weight coefficients contained in the selected weight pattern; and a synthesis element which synthesizes the appropriate exposure regions subjected to gradation correction by the gradation correction element to generate the wide dynamic range image;

wherein the gradation correction element comprises:

a characteristic amount calculation element which calculates a characteristic amount with respect to the appropriate exposure region;

a histogram generation element which generates a weighting histogram related to the characteristic amount based on the state of two-dimensional arrangement of the plurality of weight coefficients contained in the selected weight pattern;

a gradation conversion curve calculation element which calculates a gradation conversion curve based on the histogram; and a conversion element which performs gradation conversion on the appropriate exposure region by using the gradation conversion curve.

2. An image processing apparatus according to claim 1, wherein the photographing condition estimation element estimates the photographing condition based on at least one of: focal information, photometric information, zoom position information, multi-spot photometric information, line-of-sight input information, and strobe flash information.

3. An image processing apparatus according to claim 2, wherein the photographing condition estimation element estimates the photographing condition based on one of the images in the image group.

4. An image processing apparatus according to claim 2, wherein the image group comprises a long-period exposure image and a short-period exposure image.

5. An image processing apparatus according to claim 4, wherein the photographing condition estimation element estimates the photographing condition based on the long-period exposure image.

6. An image processing apparatus according to claim 2, wherein the weight coefficients in the weight pattern are arranged in correspondence with pixel positions in the input images.

7. An image processing apparatus according to claim 1, wherein the photographing condition estimation element comprises:
   a focal position estimation element which estimates a focal position as one of at least three types of focal positions including: a scenic photographing operation, a portraiture photographing operation, and a close-up photographing operation from the focal information;
   an object distribution estimation element which estimates an object distribution as one of at least three types of object distributions including: an entire screen, a center focus, and a central portion from the photometric information; and
   an integration element which integrally estimates the photographing condition by combining the focal position estimated by the focal position estimation element and the object distribution estimated by the object distribution estimation element.

8. An image processing apparatus according to claim 7, wherein the photographing condition estimation element estimates the photographing condition based on one of the images in the image group.

9. An image processing apparatus according to claim 7, wherein the image group comprises a long-period exposure image and a short-period exposure image.

10. An image processing apparatus according to claim 9, wherein the photographing condition estimation element estimates the photographing condition based on the long-period exposure image.

11. An image processing apparatus according to claim 1, wherein the gradation correction element further comprises a selection element which selects the weight pattern based on the photographing condition.

12. An image processing apparatus according to claim 11, wherein the photographing condition estimation element estimates the photographing condition based on one of the images in the image group.

13. An image processing apparatus according to claim 11, wherein the image group comprises a long-period exposure image and a short-period exposure image.

14. An image processing apparatus according to claim 13, wherein the photographing condition estimation element estimates the photographing condition based on the long-period exposure image.

15. An image processing apparatus according to claim 1, wherein the photographing condition estimation element estimates the photographing condition based on one of the images in the image group.

16. An image processing apparatus according to claim 1, wherein the image group comprises a long-period exposure image and a short-period exposure image.

17. An image processing apparatus according to claim 16, wherein the photographing condition estimation element estimates the photographing condition based on the long-period exposure image.

18. An image processing apparatus according to claim 1, wherein the weight coefficients in the weight pattern are arranged in correspondence with pixel positions in the input images.

19. An image processing apparatus according to claim 18, wherein the characteristic amount comprises an edge component calculated at each of the pixel positions in the appropriate exposure region, and the histogram generation element generates an edge histogram as the weighting histogram based on the edge component at each of the pixel positions in the appropriate exposure region and the weight coefficient corresponding to each of the pixel positions.

20. An image processing apparatus according to claim 1, wherein values of the weight coefficients are mutually independently determined.

21. An image processing apparatus according to claim 1, wherein the weight coefficients in the weight pattern are arranged irrespective of a location of an edge portion in the input images.

22. An image processing apparatus according to claim 21, wherein the weight coefficients in the weight pattern are arranged in correspondence with pixel positions in the input images, and the weight coefficients are arranged without regard to whether or not pixel positions in the input images that correspond to arrangement positions of the weight coefficients are at the edge portion.

23. A method, performed in an image processing apparatus, for processing an image group comprising a plurality of images obtained by imaging a same object under different exposure conditions to generate a wide dynamic range image, the method comprising:
   estimating a photographing condition;
   extracting an appropriate exposure region from each image in the image group based on an image signal level of the image;
   selecting, based on the photographing condition, a weight pattern comprising a two-dimensionally-arrayed plurality of weight coefficients, and performing gradation correction on each of the extracted appropriate exposure regions based on a state of two-dimensional arrangement of the plurality of weight coefficients contained in the selected weight pattern; and
   synthesizing the appropriate exposure regions subjected to gradation correction to generate the wide dynamic range image;
   wherein the gradation correction comprises:
      calculating a characteristic amount with respect to the appropriate exposure region;
      generating a weighting histogram related to the characteristic amount based on the state of two-dimensional arrangement of the plurality of weight coefficients contained in the selected weight pattern;
      calculating a gradation conversion curve based on the histogram; and
      performing gradation conversion on the appropriate exposure region by using the gradation conversion curve.

* * * * *